(12) United States Patent
Takebe et al.

(10) Patent No.: US 8,652,590 B2
(45) Date of Patent: Feb. 18, 2014

(54) POLARIZING PLATE AND LIQUID CRYSTAL DISPLAY

(75) Inventors: Takashi Takebe, Hachioji (JP);
Masataka Takimoto, Hachioji (JP);
Nobuo Kubo, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 242 days.

(21) Appl. No.: 13/000,331

(22) PCT Filed: May 21, 2009

(86) PCT No.: PCT/JP2009/059342
§ 371 (c)(1),
(2), (4) Date: Dec. 20, 2010

(87) PCT Pub. No.: WO2010/001668
PCT Pub. Date: Jan. 7, 2010

(65) Prior Publication Data
US 2011/0090434 A1    Apr. 21, 2011

(30) Foreign Application Priority Data

Jul. 3, 2008   (JP) ................................ 2008-174792
Jul. 22, 2008  (JP) ................................ 2008-188361

(51) Int. Cl.
*G02F 1/1335*    (2006.01)

(52) U.S. Cl.
USPC ........................... 428/1.33; 428/96; 428/122

(58) Field of Classification Search
USPC .................................... 428/1.33; 349/96, 122
See application file for complete search history.

(56) References Cited

U.S. PATENT DOCUMENTS

| | | | |
|---|---|---|---|
| 4,564,545 A * | 1/1986 | Okumura et al. | 428/76 |
| 2006/0051526 A1* | 3/2006 | Fukagawa et al. | 428/1.31 |
| 2007/0058111 A1* | 3/2007 | Kobayashi et al. | 349/96 |
| 2007/0211336 A1* | 9/2007 | Michihata | 359/485 |
| 2007/0222920 A1* | 9/2007 | Oka | 349/96 |
| 2007/0243364 A1* | 10/2007 | Maekawa et al. | 428/220 |

FOREIGN PATENT DOCUMENTS

| | | |
|---|---|---|
| JP | 5-119217 A | 5/1993 |
| JP | 2002-196132 A | 7/2002 |
| JP | 2003-12859 A | 1/2003 |
| JP | 2005-128520 A | 5/2005 |
| JP | 2005-272800 A | 10/2005 |
| JP | 2008-102475 A | 5/2008 |

OTHER PUBLICATIONS

JPO Website Machine English Translation of JP 2002-356658, Yamamoto et al., Dec. 13, 2002.*
Japanese Office Action (Notice of Reasons of Refusal) dated Mar. 4, 2013 (with an English-language translation thereof) for Japanese patent application 2010-518962.

* cited by examiner

*Primary Examiner* — Sophie Hon
(74) *Attorney, Agent, or Firm* — Holtz Holtz Goodman & Chick PC

(57) ABSTRACT

Disclosed is a polarizing plate having low moisture absorption, wherein fading deterioration of a polarizer is improved. A liquid crystal display using the polarizing plate is also disclosed. The polarizing plate is obtained by sandwiching a polarizer composed of a polyvinyl alcohol with an acrylic film (a) having a water vapor permeability of 100-500 $g/m^2 \cdot 24$ hr and a cellulose ester film (b1) containing no phosphate plasticizer or a cellulose ester film (b2) containing a phosphate plasticizer and an acid scavenger. The polarizing plate is arranged on at least one side of a liquid crystal cell, with the cellulose ester film (b1) or (B2) being on the liquid crystal cell side.

4 Claims, 1 Drawing Sheet

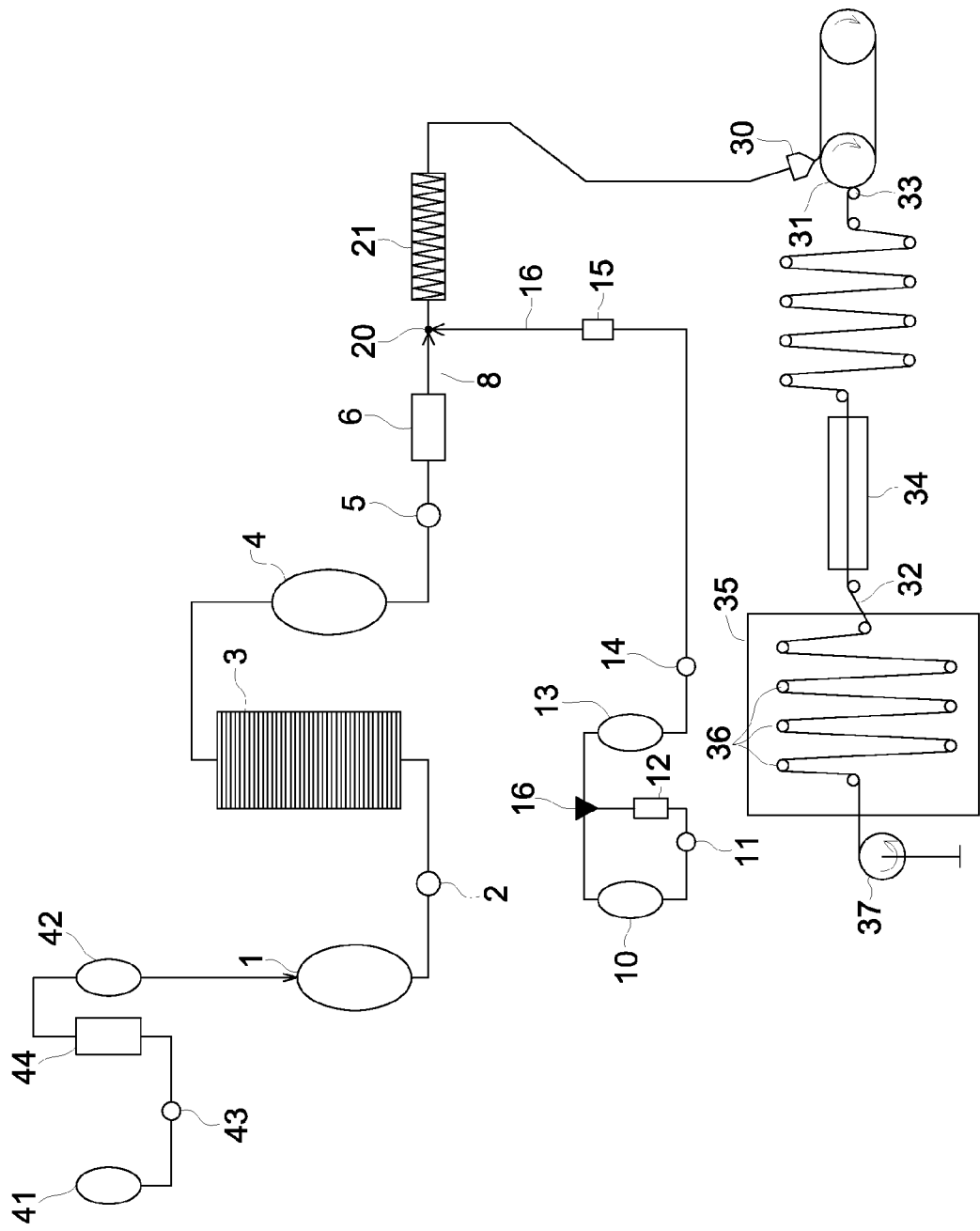

POLARIZING PLATE AND LIQUID CRYSTAL DISPLAY

This application is the United States national phase application of International Application PCT/JP2009/059342 filed May 21, 2009.

FIELD OF THE INVENTION

The present invention relates to a polarizing plate having an excellent moisture resistance.

BACKGROUND OF THE INVENTION

A liquid crystal display is constituted of a liquid crystal cell in which transparent electrodes, a liquid crystal layer, and a color filter is sandwiched by glass plates, and two polarizing plates provided on both sides thereof. Each polarizing plate has a structure in which a polarizer (also referred to as a polarizer or a polarizing film) is sandwiched by two polarizing plate protective films.

As this polarizing plate protective film, a cellulose ester film of which retardation value is easily adjusted is usually used.

According to the expansion of the field of liquid crystal displays, the deterioration due to fading caused by the moisture absorption of the polarizer has become a problem, and the polarizing plate has been asked for higher moisture resistance as the utilization field of a liquid crystal display expands.

Since the moisture resistance of a conventionally used cellulose ester film is limited, there has been proposed a technique to use an acrylic resin which is a material for a low moisture absorbing acrylic film, for example, polymethylmethacrylate copolymer, is used for polarizing plate protective films on both sides (refer to Patent Document 1).

However, a polarizing plate having an acrylic film as a polarizing plate protective film is inferior with respect to brittleness, therefore, it suffers from poor workability, for example, a cutting property. Accordingly, there has been proposed after that a technique to uses a polycycloorefine film, a polycarbonate film or a polyester film as a polarizing plate protective film facing the external environment, and a cellulose ester film as a polarizing plate protective film facing the liquid crystal cell (refer to Patent Documents 2 and 3).

However, even when the above mentioned low moisture absorbing polymer film was used as a polarizing plate protective film facing the external environment, fading deterioration of a polarizer due to water was sometimes observed.

PRIOR TECHNICAL DOCUMENTS

Patent Documents

Patent Document 1: Japanese Patent Application Publication Open to Public Inspection (hereinafter referred to as JP-A) No. 5-119217
Patent Document 2: JP-A No. 2005-272800
Patent Document 3: JP-A No. 2008-102475

DISCLOSURE OF THE INVENTION

Problems to be Solved by the Invention

As the results of the examination, the present inventor have found that, when a cellulose ester film as a polarizing plate protective film facing the liquid crystal cell and a polarizer, both of which inherently contain a certain amount of water are used, and, when a low moisture absorbing polarizing plate protective film is provided on the opposite side, the inherently contained water is sealed in after the polarizing plate is adhered on the liquid crystal cell and, thus, fading deterioration of the polarizer also occurs due to the sealed water.

It has also been found that, when a phosphate ester is used as a plasticizer of a cellulose ester film, phosphoric acid generated by the hydrolysis of the phosphate ester accelerates the fading deterioration of the polarizer.

Since a cellulose ester film is inherently an excellent material for the optical compensation of the polarizing plate, it is difficult at present to find an alternative film as a polarizing plate protective film to be used on the liquid crystal cell side.

In view of the foregoing problems, the present invention was achieved. An object of the present invention is to provide a polarizing plate exhibiting improved fading deterioration of a polarizer while the polarizing plate exhibits a low moisture absorbing property, and to provide a liquid crystal display employing the polarizing plate.

Means to Solve the Problems

The present inventors have found that, instead of lowering the moisture permeability of the polarizing plate protective film provided on the side in contact with the external environment, it is possible to prevent fading deterioration by using the polarizing plate protective film having a certain extent of moisture permeability.

The above object of the present invention is achieved by the following structures.

1. A polarizing plate comprising:
   acrylic film (a) having a moisture permeability of 100-500 $g/m^2 \cdot 24$ hr;
   cellulose ester film (b1) containing no phosphate plasticizer or cellulose ester film (b2) containing a phosphate plasticizer and an acid scavenger, and
   a polarizer comprising a polyvinyl alcohol, the polarizer being sandwiched between acrylic film (a) and one of cellulose ester film (b1) and cellulose ester film (b2),
   wherein the polarizing plate is provided on at least one surface of a liquid crystal cell so that cellulose ester film (b1) or (b2) faces the liquid crystal cell.

2. The polarizing plate of Item 1, wherein
   acrylic film (a) is free from ductile fracture under a condition of 23° C. and 55% RH, and
   acrylic film (a) exhibits a tension softening point of 105-145° C. and a haze of less than 1%.

3. The polarizing plate of Item 1 or 2, wherein
   acrylic film (a) comprises acrylic resin (A) and cellulose ester resin (B) at a weight ratio of 95:5-50:50 in a compatible state, wherein
   acrylic resin (A) has a weight average molecular weight Mw of 80000-1000000,
   cellulose ester resin (B) has
   a weight average molecular weight Mw of 75000-280000,
   a total substitution degree (T) of an acyl group of 2.0 -3.0, and
   a substitution degree of an acyl group having 3-7 carbon atoms of 1.2-3.0, and
   acrylic film (a) has a moisture permeability of 200-450 $g/m^2 \cdot 24$ hr.

4. A liquid crystal display employing the polarizing plate of any one of Items 1-3.

Effect of the Invention

According to the present invention, a polarizing plate exhibiting improved fading deterioration of a polarizer while the polarizing plate exhibits a low moisture absorbing property, and a liquid crystal display employing the polarizing plate can be provided.

BRIEF DESCRIPTION OF THE DRAWINGS

FIG. 1 is a schematic drawing illustrating one example of a dope preparation process, a casting process and a drying process of a solution casting film forming method employed in the present invention.

DESCRIPTION OF THE PREFERRED EMBODIMENTS

<Polarizing Plate>

The polarizing plate of the present invention is characterized in that the polarizing plate is constituted by sandwiching a polarizer containing a polyvinyl alcohol with acrylic film (a) having a moisture permeability of 100-500 g/m²·24 hr and one of cellulose ester films (b1) and (b2), wherein the polarizing plate is provided on a viewer's side surface of a liquid crystal cell and the acryl film (a) is provided on a side opposite the liquid crystal cell.

In general, a pair of polarizing plates are provided on both surfaces of a liquid crystal cell in a crossed Nicol state, while one polarizing plate is provided on the backlight side and the other is on the viewer's side. The polarizing plate of the present invention is provided on the viewer's side.

Further, a polarizing plate is adhered to a liquid crystal cell usually through an adhesive layer, in which the side of cellulose ester film (b1) or (b2) of the polarizing plate is adhered to the liquid crystal cell. Therefore, the liquid crystal has the acrylic film (a) provided on the outermost surface of the viewer's side.

<Acrylic Film (a)>

The moisture permeability of the acrylic film (a) of the present invention was attained by an acrylic resin (A) and a cellulose ester resin (B), a resin other than the acryl resin (A) and the cellulose ester resin (B), if necessary, and other additive.

Although the compatibility between the resins had been a problem in the initial stage, the problem of the compatibility has been overcome by adjusting the ranges of molecular weight and substitution degree of the cellulose ester of the present invention.

According to this constitution, the acrylic film (a) of the present invention is characterized in that the moisture permeability is 100-500 g/m²·24 hr and more preferably 200-450 g/m²·24 hr; no ductile fracture occurs under a condition of 23° C. and 55% RH, the tension softening point is 105-145° C., and the haze is less than 1%.

More specifically, the acryl film (A) of the present invention is characterized in that acrylic resin (A) and cellulose ester resins are incorporated in a compatible state at a weight ratio of 95:5-30:70, the weight average molecular weight Mw of aforesaid acrylic resin (A) is 80000 or more but 1000000 or less, degree of total substitution (T) of the acyl group of aforesaid cellulose ester resin (B) is 2.0-3.0, the substitution degree of the acyl group having 3-7 carbon atoms is 1.2-3.0, and weight average molecular weight (Mw) of aforesaid cellulose ester resin (B) is 75000 or more but 280000 or less.

A further preferable constitution is that the above acryl film incorporates acrylic particles (C) in an amount of 0.5-30% by weight based on the total weight of the resins constituting the aforesaid film.

<Acrylic Resin (A)>

The acrylic resins employed in the present invention includes also a methacrylic resin. The resin preferably contains 50-99% by weight of methyl methacrylate units and 1-50% by weight of other monomer units which are copolymerizable with the above resin.

Other copolymerizable monomers include α,β-unsaturated acids such as alkyl methacrylate, in which the number of carbon atoms of the alkyl group is 2-18, alkyl acrylate, in which the number of carbon atoms of the alkyl group is 1-18, acrylic acid, or methacrylic acid; unsaturated group containing divalent carboxylic acids such as maleic acid, fumaric acid, or itaconic acid; aromatic vinyl compounds such as styrene or α-methylstyrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

Specifically, in view of a decrease in brittleness as an acrylic film and improvement of transparency when compatibilized with cellulose ester resin (B), the weight average molecular weight (Mw) of acrylic resin (A), employed in the present invention, is at least 80,000. When the weight average molecular weight (Mw) of acrylic resin (A) is at most 80,000, brittleness is not sufficiently improved and compatibility with cellulose ester resin (B) deteriorates.

The weight average molecular weight (Mw) of acrylic resin (A) is preferably in the range of 80000-1000000, more preferably in the range of 100,000-600,000, but is most preferably in the range of 150,000-400,000. The upper limit of the weight average molecular weight (Mw) of acrylic resin (A) is not particularly limited, but in view of its production, a preferred embodiment is that the upper limit is at most 1,000,000.

It is possible to determine the weight average molecular weight of acrylic resins of the present invention via gel permeation chromatography (GPC). Measurement conditions are as follows.

Solvent: methylene chloride

Columns: SHODEX K806, K805, and K803G (produced by Showa Denko K. K., three columns were employed via connections)

Column temperature: 25° C.

Sample concentration: 0.1% by weight

Detector: RI Model 504 (produced by GL Sciences Inc.)

Pump: L6000 (produced by Hitachi Ltd.)

Flow rate: 1.0 ml/min

Calibration curve: A calibration curve prepared by employing 13 samples of standard polystyrene STK (produced by Tosoh Corp.) in the range of Mw=2,800,000–500 was employed. It is preferable to employ the 13 samples at nearly equal intervals.

The manufacturing methods of acrylic resin (A) in the present invention are not particularly limited, and employed may be any of the conventional methods such as suspension polymerization, emulsion polymerization, bulk polymerization, or solution polymerization.

As the acrylic resins according to the present invention, also employed may be commercially available ones. Examples thereof include DERPET 60N and 80N (both produced by Asahi Kasei Chemicals Co., Ltd.), DIANAL BR52, BR80, BR83, BR85, and BR88 (all manufactured by Mitsubishi Rayon Co., Ltd.), and KT75 (produced by Denki Kagaku Kogyo K. K). acrylic resins may be employed in combinations of at least two types.

<Cellulose Ester Resin (B)>

Specifically, in view of improvement of brittleness and transparency when compatibilized with acrylic resin (A), it is preferable that total substitution degree (T) of the acyl group is 2.0-3.0, the substitution degree of the acyl group having 3-7 carbon atoms is 1.2-3.0, and the substitution degree of the acyl group having 3-7 carbon atoms is 2.0-3.0.

The cellulose ester resins of the present invention are those substituted with the acyl group having 3-7 carbon atoms. In practice, preferably employed are propionyl and butyryl groups, and the propionyl group is most preferably employed.

With respect to the acyl substitution degree of cellulose ester resin (B) of the present invention, it is preferable that the total substitution degree (T) is 2.0-3.0, the substitution degree of the acyl group having 3-7 carbon atoms is 1.2-3.0, and the substitution degree of the acyl group other than the acyl group having 3-7 carbon atoms, namely, the acetyl group having 8 or more carbon atoms is 1.3 or less.

Further, total substitution degree (T) of cellulose ester resin (B) is more preferably in the range of 2.5-3.0.

In the present invention, the above acyl group may be either an aliphatic acyl group or an aromatic acyl group. The aliphatic acyl group may be straight-chained or branched, and may have a substituent. The number of carbon atoms of the acyl group in the present invention includes those in the substituent of the above acyl group.

When above cellulose ester resin (B) incorporates aromatic acyl groups as a substituent, it is preferable that the number of substituent X substituted onto an aromatic ring is 0-5. In this case, it should be considered that the substitution degree of the acyl group which has 3-7 carbon atoms including the substituent is regulated to be 1.2-3.0.

Further, when the number of substituents substituted onto an aromatic ring is at least 2, they may be the same or different. Further, they may be combined to form condensed polycyclic compounds (for example, naphthalene, indene, indan, phenanthrene, quinoline, isoquinoline, chromene, chroman, phthalazine, acridine, indole, and indoline).

Cellulose ester resin (B), described above, has a structure having at least one aliphatic acyl group having 3-7 carbon atoms. The above structure is employed in the cellulose ester resins of the present invention.

The substitution degree of cellulose ester resin (B) according to the present invention is that total substitution degree (T) of the acyl group is 2.0-3.0, while the substitution degree of the acyl group having 3-7 carbon atoms is 1.2-3.0.

Further, the preferred structure is that the total substitution degree of those other than the acyl group having 3-7 carbon atoms, namely the acetyl group and the acyl group having at least 8 carbon atoms, is at most 1.3.

Cellulose ester resin (B) according to the present invention is preferably one type selected particularly from cellulose acetate propionate, cellulose acetate butyrate, cellulose acetate benzoate, cellulose propionate, and cellulose butyrate. Namely, preferred are those having an acyl group having 3-4 carbon atoms as a substituent.

Of these, particularly preferred cellulose ester resins include cellulose acetate propionate and cellulose propionate. These cellulose esters can be synthesized according to a well-known method.

The substitution degree of the acetyl group and other acyl groups refers to the value determined by the method specified in ASTM-D817-96.

Specifically, in view of compatibility with acrylic resin (A) and lowering of brittleness, weight average molecular weight (Mw) of the cellulose ester resins according to the present invention is commonly at least 75,000, is preferably in the range of 75,000-300,000, is more preferably in the range of 100,000-240,000, but is most preferably in the range of 160,000-240,000. The weight average molecular weight was measured according to the aforementioned method.

In the present invention, two or more types of cellulose resins may be employed after blending.

In the acrylic film of the present invention, acrylic resin (A) and cellulose ester resin (B) are incorporated in a compatible state at a weight ratio of 95:5-30:70. The above ratio is preferably 95:5-50:50, but is more preferably 90:10-60:40.

In the acrylic film of the present invention, it is essential that acrylic resin (A) and cellulose ester resin (B) are incorporated in a compatible state. Physical properties and qualities demanded as an acrylic film are realized via mutual compensation by achieving compatibility of the different resins.

<Judgment of Compatibility>

It is possible to find whether acrylic resin (A) and cellulose ester resin (B) are in a compatible state, by, for example, glass transition temperature Tg.

When both resins are merely blended, at least two glass transition temperatures of the blend co-exist due to the presence of each of the glass transitions of the resins. On the other hand, when both resins are compatible, the inherent glass transition temperature of each the resins disappears to result in one glass transition temperature which is the glass transition temperature of the resulting compatible resin.

It is known that the glass transition temperature $Tg_{1,2}$ of the mixture in a compatible state can be approximated by Gordon-Taylor's formula (M. Gordon and J. S. Taylor, 2 J. of Applied Chem. 493-500 (1952)):

$$Tg_{1,2}=(w_1 T_{g1}+Kw_2 T_{g2})/(w_1+Kw_2)$$

[wherein $w_1$ and $w_2$ represent the mass fractions of constituents 1 (acrylic resin (A)) and 2 (cellulose ester resin (B)), and; $T_{g1}$ and $T_{g2}$ each represent the glass transition temperature (temperature in Kelvin) of constituents 1 and 2, respectively; $T_{g1,2}$ are the glass transition temperature of the mixture of constituents 1 and 2, and; K is a constant regarding the free volume of two resins.]

Glass transition temperature, as described herein, refers to an intermediate point glass transition temperature (Tmg) determined in accordance with JIS K7121 (1987) which is measured at a temperature increasing rate of 20° C./minute, employing a differential scanning calorimeter DSC-7, produced by Perkin Elmer Co.).

Acrylic resin (A) and cellulose ester resin (B) each is a preferably non-crystalline resin, and one of them may be a crystalline polymer or a polymer exhibiting partial crystallinity. In the present invention, it is preferable that acrylic resin (A) and cellulose ester resin (B) are dissolved with each other to form a non-crystalline resin.

In order to dissolve acrylic resin (A) and cellulose ester (B) of the present invention with each other, it is preferred to conduct a miscibility test in advance to select resins which are miscible with each other.

Specifically, the miscibility test is conducted in such a manner that 5% solutions in which resins (A) and (B) are individually dissolved in 100 ml methylene chloride are mixed to evaluate the mixed state by the turbidity or by visual observation. The two resins may be concluded to be miscible when notable turbidity is not observed or no separation into two layers is visually observed. This test readily makes it possible to choose the resins.

Further, "incorporating acrylic resin (A) and cellulose ester resin (B) in a compatible state", as described in the present invention, refers to such a state that resins (being polymers) are blended in a compatible state, and does not include a state in which blended resins are prepared via polymerization after an acrylic resin precursor such as a monomer, a dimers, or an oligomers is blended with cellulose ester resin (B).

A process to prepare blended resins via polymerization after blending cellulose ester resin (B) with an acrylic precursor such as a monomer, a dimer, or a oligomer, contains a complicated polymerization reaction. Resins prepared by the above method results in difficult reaction control, whereby it becomes difficult to control the molecular weight.

The acrylic film (a) of the present invention may be composed of a resin other than acrylic resins (A) and cellulose ester resin (B) or an additives.

When a resin other than acrylic resin (A) and cellulose ester resin (B) is incorporated, added resin may be in a compatible state or may be simply mixed or dispersed without being dissolved.

The total weight of acrylic resin (A) and cellulose ester resin (B) in the acrylic film (a) of the present invention is preferably at least 55% by weight is more preferably at least 60% by weight, but is most preferably at least 70% by weight, based on the weight of the acrylic film.

When a resin or an additive other than acrylic resin (A) and cellulose ester resin (B) is employed, it is preferable to adjust the added amount within the range in which the function of the acrylic film (a) of the present invention is not adversely affected.

<Resins Other than Acrylic Resin (A) or Cellulose Ester Resin (B)>
<Acrylic Particles (C)>

Acrylic film (a) of the present invention may contain acrylic particles (C) as a resin other than acrylic resin (A) and cellulose ester resin (B).

Acrylic particles (C) invention exist in a mixed/dispersed state without being miscible in an acrylic film (a) incorporating above acrylic resin (A) and cellulose ester resin (B) in a compatible state.

A specified amount of a prepared acrylic film (a) is sampled, and the above acrylic film (a) is dissolved in a solvent. After complete dissolution/dispersion, filtration is carried out employing a membrane filter produced by PTFE having a pore diameter which is less than the average particle diameter of acrylic particles (C). It is preferable that any insoluble substance which is collected via the above filtration is 90% by weight or more of acrylic particles (C) added to the acrylic film (a).

Acrylic particles (C) employed in the present invention are not specifically limited, but it is preferable that each of acrylic particles (C) is structured to have a layer configuration of at least two layers. Further, it is specifically preferable that each particle is an acrylic granular complex having the following multilayer structure.

"Multilayer structure acrylic granular complex", as described herein, refers to a granular acrylic polymer having a structure in which an innermost hard polymer layer, an elastic crosslinked soft polymer layer and an outermost hard polymer layer are stacked in that order from the center to the peripheral area of the particle.

Examples of commercial products of the above multilayer structure acrylic granular complex include METABLEN W-314 produced by Mitsubishi Rayon Co., Ltd., CHEMISNOW MR-2G (C3) and MS-300X (C4) (produced by Soken Chemical & Engineering Co., Ltd.), KANEACE produced by Kaneka Corp., PARALOID produced by Kureha Chemical Industry Co., Ltd., "ACRYLOID" produced by Rohm and Haas Co., "STAFILOID" produced by Ganz Chemical Industry Co., and "PARAPET SA" produced by Kuraray Co., Ltd. These products may be employed individually or in combinations of two or more kinds.

The acrylic film (a) of the present invention incorporates acrylic particles (C), preferably in the amount of 0.5-30% by, but more preferably in the amount of 1.0-15% by weight, based on the total weight of resins constituting the above film.
<Other Additives>

In the acrylic film (a) of the present invention, in order to enhance fluidity and flexibility of the composition, it is possible to simultaneously employ a plasticizer. Plasticizers may be a phthalate plasticizer, an aliphatic acid ester plasticizer, a trimellitate plasticizer, a phosphate plasticizer, a polyester plasticizer or an epoxy plasticizer.

Of these, a polyester plasticizer and a phthalate plasticizer are preferably employed. The polyester plasticizer excels in non-mobility and extraction resistance, compared to the phthalate plasticizer such as dioctyl phthalate, but are slightly inferior in plasticizing effects and compatibility.

Consequently, by selecting or simultaneously employing these plasticizers depending on intended use, they may be used for a wide range of applications.

A polyester plasticizer is obtained by reacting a carboxylic acid of univalent-tetravalent with an alcohol of univalent-hexavalent, and those which are prepared by reacting divalent carboxylic acid with glycol are mainly employed. Examples of a typical divalent carboxylic acid include glutaric acid, itaconic acid, adipic acid, phthalic acid, azelaic acid and sebacic acid.

Particularly, the use of adipic acid and phthalic acid enables preparation of a plasticizer which excels in plasticizing characteristics. Examples of a glycol include ethylene, propylene, 1,3-butyrene, 1,4-butyrene, 1,6-hexamethylene neopentylene, diethylene and dipropylene. These divalent carboxylic acids and glycols may be employed individually or in combination.

The above ester based plasticizers may be any of the an oligoester or a polyester, of which molecular weight is preferably in the range of 100-10,000, but is more preferably in the range of 600-3,000, at which range, plasticizing effects are more enhanced.

Further, the viscosity of a plasticizer correlates with their molecular structure and molecular weight. In the case of an adipic acid plasticizer, the viscosity is preferably in the range of 200-5,000 MP·s (at 25° C.) in view of plasticization efficiency. Further, a plurality of polyester plasticizers may be used in combination.

It is preferable that 0.5-30 parts by weight of a plasticizer is added in 100 parts by weight of the acrylic film (a) of the present invention.

It is preferable that the acrylic film (a) of the present invention incorporates a UV absorber. As employed UV absorber, those which are benzotriazole based, 2-hydoxybenzophenone based, and salicylic acid phenyl ester based may be cited. For example, cited may be triazoles such as 2-(5-methyl-2-hydroxyphenyl)benzotriazole, 2-[2-hydroxy-3,5-bis (α,α-dimethylbenzyl)phenyl]-2H-benzotriazole, or 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone.

Of UV absorbers, those having a molecular weight of 400 or more exhibit a high boiling point and are neither easily volatized nor scattered during molding at a high temperature. Consequently, it is possible to effectively improve weather resistance via their addition of a relatively small amount.

UV absorbers having a molecular weight of at least 400 include benzotriazole based ones such as 2-[2-hydoxy-3,5-bis(α,α-dimethylbenzyl)phenyl]-2-benzotriazole, or 2,2-methylenebis[4-(1,1,3,3-tetrabutyl)-6-(2H-benzotriazole-2-yl)phenol; hindered amine based ones such as bis(2,2,6,6 tetramethyl-4-piperidyl)sebacate or bis(1,2,2,6,6-pentamethyl-4-piperidyl)sebacate; further hybrid based ones having hindered phenol and hindered amine structures in the molecule such as 2-(3,5-di-t-butyl-4-hydroxybenzyl)-2-n-butyl-malonic acid bis(1,2,2,6,6-pentamethyl4-piperidyl) or 1-[2-[3-(3,5-di-t-butyl-4-hydroxyphenyl)propionyloxy]2,2,6,6-tetramethylpyperidine. These may be employed individually or in combinations of at least two types.

Of these, particularly preferred are 2-[2-hydroxy-3,5-bis (α,α-dimethylbenzyl)phenyl]-2-benzotriazole and 2,2-methylenebis[4-(1,1,3,3-tetrabutyl)-6-(2H-benzotriazole-2-yl) phenol.

Further, in order to minimize thermal decomposition and thermal staining during molding, it is possible to add various antioxidants to the acrylic film (a) of the present invention. Still further, by the addition of antistatic agents, it is possible to provide the acrylic film (a) with antistatic capability.

In order to improve the handling ability of acrylic film (a), particles such as a matting agent which will be described later may be incorporated.

<Properties of Acrylic Film (a)>

Acrylic film (a) of the present invention is evaluated based on a criterion whether it is an acrylic film which cause ductile fracture or not.

"Ductile fracture", as described herein, refers to fracture occurs when a stress greater than the strength of a material is applied to the material, and is defined as fracture of a material accompanied with marked elongation and twisting until finally fractured.

In the present invention, "an acrylic film which results in no ductile fracture" is evaluated in such a manner that no fracture results even by applying a large stress to the film which allows the film to fold back on itself under a condition of 23° C. and 55% RH.

In the present invention, when a tension softening point of acrylic film (a) is 105-145° C. under a condition of 23° C. and 55% RH, it is judged that the film exhibits sufficient heat resistance. The tension softening point is specifically preferably controlled within 110 and 130° C.

Further, in view of heat resistance, glass transition temperature (Tg) of acrylic film (a) is preferably at least 110° C., is more preferably at least 120° C., but is most preferably at least 150° C.

As an index to evaluate the transparency of the acrylic film (a) of the present invention, employed is a haze value (being turbidity). Specifically, since liquid crystal display devices employed outdoor are desired to exhibit sufficient luminance and high contrast in bright places, the haze value is preferably at most 1.0%, but is more preferably at most 0.5%.

The acrylic film (a) of the present invention, which incorporates acrylic resin (A) and cellulose ester resin (B), enables realization of high transparency. When acrylic particles are employed to improve other physical properties, it is possible to minimize an increase in the haze value by decreasing the difference in refractive index between the resin (acrylic resin (A) and cellulose ester resin (B)) and acrylic particles (C).

Further, since surface roughness also affects the haze value as a surface haze, it is effective that the diameter and added amount of acrylic particles (C) are regulated within the above range and the surface roughness of a film contacting portion during film making is kept low.

Further, the number of defects at a diameter of at least 5 μm on the surface of the acrylic film (a) of the present invention is preferably 1/10 cm$^2$ or less, but is more preferably 0.1/10 cm$^2$ or less.

Further, rupture elongation of the acrylic film (a) of the present invention in at least one direction is preferably 10% or more, but is more preferably 20% or more, which is determined according to JIS K7127 1999.

Thickness of the acrylic film (a) of the present invention is preferably at least 20 μm, but is more preferably at least 30 μm.

Total light transmittance of the acrylic film of the present invention is preferably at least 90%, but is more preferably at least 93%. Further, the practical upper limit is approximately 99%.

When the acrylic film (a) of the present invention satisfies the above physical properties, it may be specifically preferably employed as a polarizing plate protective film for outdoor liquid crystal display devices.

The above physical properties are realized by employing an acrylic film (a) characterized in that acrylic resin (A) and cellulose ester resin (B) are incorporated at a weight ratio of 95:5-30:70, average molecular weight Mw of above acrylic resin (A) is at least 80,000, and cellulose ester resin (B) has a total substitution degree (T) of the acyl group of 2.00-3.00, a substitution degree of the acyl group having 3-7 carbon atoms of 1.2-3.0 and a weight average molecular weight (Mw) of 75,000 or more.

<Production of Acrylic Film (a)>

Examples of the production method of an acrylic film (a) will now be described, however the present invention is not limited thereto.

As a production method of acrylic film (a), employed may be an inflation method, a T-die method, a calendering method, a cutting method, a casting method, an emulsion method, or a hot press method. In view of suppression of coloration, reduction of foreign matter defects, and decrease in optical defects such as die line, preferred is a solution casting film production method, a solution casting film production method employing a casting method.

(Organic Solvents)

When acrylic film (a) of the present invention is produced via a solution casting method, as useful organic solvents to form a dope, any solvent may be employed without limitation as long as it simultaneously dissolves acrylic resin (A), cellulose ester resin (B), occasionally, acrylic particles (C) and other additives.

Examples thereof may include: as chlorine-containing organic solvents, methylene chloride; and as non-chlorine-containing organic solvents, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Methylene chloride, methyl acetate, ethyl acetate, and acetone are preferably employed.

It is preferable that other than the above organic solvents, incorporated in the dope are aliphatic alcohols having a straight or branched chain having 1-4 carbon atoms in an amount of 1-40% by weight. As the alcohol ratio in the dope increases, the resulting web is gelled, whereby peeling from a metal support become easier. Further, as the ratio of alcohol is low, it enhances dissolution of acrylic resin (A) and cellulose ester resin (B) in a non-chlorine-containing organic solvent.

Specifically, a dope composition is preferred which is prepared by dissolving, in solvents incorporating methylene chloride and aliphatic alcohols having a straight or branched chain having 1-4 carbon atoms, three of acrylic resin (A), cellulose ester resin (B), and acrylic particles (C) in an total amount of 15-45% by weight.

As aliphatic alcohols having a straight or branched chain having 1-4 carbon atoms, listed may be methanol, ethanol, n-propanol, iso-propanol, n-butanol, sec-butanol, and tert-butanol. Of these, in view of stability of the dope, a lower boiling point and a excellent drying property, methanol is preferred.

The preferable film production method of the acrylic film (a) of the present invention will now be described.

1) Dissolution Process

A dissolution process prepares a dope in such a manner that acrylic resin (A) and cellulose ester resin (B), and in some cases, acrylic particles (C) and other additives are dissolved, while stirring, in organic solvents mainly composed of good solvents for above acrylic resin (A) and cellulose ester resin (B) employing a dissolution kettle, or prepares a dope which is a major dissolution liquid by blending, in some cases, a solution of acrylic particles (C) and a solution of other additive with a solution of above acrylic resin (A) and cellulose ester resin (B).

It is possible to dissolve acrylic resin (A) and cellulose ester resin (B) via various dissolution methods such as: a method in which dissolution is carried out at normal pressure, a method in which dissolution is carried out at the temperature equals to or less than the boiling point of the major solvent, a method employing any of the cooling dissolution methods described in JP-A Nos. 9-95544, 9-95557 or 9-95538, a method, described in JP-A No. 11-21379, in which dissolution is carried out under high pressure. Of these, preferred is the method in which dissolution is carried out at the temperature of equals to or above the boiling point of the major solvent under pressure application.

The total concentration of acrylic resin (A) and cellulose ester resin (B) in a dope is preferably in the range of 15-45% by weight. Additives are added to the dope during or after dissolution. After dissolution or dispersion, the resulting mixture is filtered via a filter and defoamed, followed by transfer to the next process via a solution conveying pump.

It is preferable that filtration is carried out employing a filter at a particle catching diameter of 0.5-5 μm and a filtered water time of 10-25 seconds/100 ml.

In the above method, aggregates remained during particle dispersion and formed during the addition of the major dope, are only removable by employing a filter at a particle catching diameter of 0.5-5 μm and a filtered water time of 10-25 seconds/100 ml. In the major dope, since particle concentration is sufficiently low compared to that of the added solution, no abrupt increase in filtering pressure due to mutual adhesion of aggregates during filtration occurs.

FIG. 1 is a schematic view of one example of a dope preparation process, a casting process, and a drying process of the solution casting film producing method which is preferred in the present invention.

If needed, large aggregates are removed via filtering device 44 from the acrylic particle preparation kettle, followed by transfer to stock kettle 42. Thereafter, an acrylic particle adding solution is added to major dope dissolving kettle 1 from stock kettle 42.

Thereafter, the major dope solution is filtered via major filtering device 3, followed by the inline addition of UV absorbing agent adding solution 16.

In many cases, the major dope occasionally incorporates side materials in an amount of about 10-about 50% by weight. Occasionally, the side materials include acrylic particles. In such a case, it is preferable to control the added amount of the acrylic particle adding solution matching to that of the added amount of the side materials.

The content of acrylic particles in the acrylic particle-containing addition solution is preferably 0.5-10% by weight, is more preferably 1-10% by weight, but is most preferably 1-5% by weight.

The above addition range is preferred since the added solution is easily handled due to its low viscosity, and is easily added to the major dope.

"Side materials", as described herein, refer to ones which are produced by finely pulverizing acrylic film (a). Available ones include trimmed portions of film of both edges formed during production of acrylic film (a) and mill rolls which are not within the specifications, for example, due to the presence of abrasion defects.

Further, it is possible to preferably employ pellets which are prepared by kneading acrylic resins and cellulose ester resins, and possibly acrylic particles, followed by pellet formation.

2) Casting Process

A casting process is one in which dope is transferred to pressurized die 30 via a solution sending pump (for example, a pressurized type quantitative gear pump) and is cast from the pressurized die slit onto the casting position on continuously moving looped metal belt 31 such as a stainless steel belt, or a rotating metal drum.

A pressurized die is preferred in which the slit shape of the hole metal portion of the die can be regulated to easily make the film thickness uniform. Pressurized dies include a coat hanger die and a T die, and any of these are preferably employed. The surface of metal supports is finished to be specular. In order to increase the film production rate, a multilayer may be realized in such a manner that at least two pressurized dies are provided on the metal support and the dope is divided into several portions. Alternately, it is also preferable to prepare a laminated structure film via a co-casting method in which a plurality of divided dope portions is simultaneously cast.

3) Solvent Evaporating Process

A solvent evaporating process is one in which a web (namely, a dope is cast onto a casting support and the resulting dope film is called a web) is heated on the casting support, whereby solvents evaporate.

Solvents are evaporated via a method in which air is blown from the web side and/or a method in which heat is transmitted via a liquid from the reverse side, and a method in which heat is transmitted via radiant heat from both the front and reverse surfaces. Of these, the reverse surface liquid heat transmission method is preferred since higher drying efficiency is realized. Further, preferably employed are combinations of these methods. It is preferable that the web, on the support after casting, is dried on the support under an ambience of 40-100° C. In order to maintain the ambience of 40-100° C., it is preferable that airflow at the above temperature impinges the upper surface of the web, or heating is carried out via means such as infrared rays.

In view of surface quality, hygroscopicity, and peeling properties, the above web is peeled from the web within 30-120 seconds.

4) Peeling Process

A peeling process is one in which a web, from which solvents have been evaporated on the metal support, is peeled in a predetermined peeling position. The peeled web is conveyed to the following process.

Temperature in the peeling position on the metal support is preferably 10-40° C., but is more preferably 11-30° C.

The residual solvent amount while peeled in the web on the metal support is preferably in the range of 50-120% by weight in view of drying conditions and the length of the metal support. When peeled in the presence of a relatively large amount of residual solvents, the web is excessively soft, whereby flatness is deteriorated to tend to form wrinkles and longitudinal streaks caused by peeling tension. Consequently, the amount of residual solvents in the peeling position is determined via compatibility between an economical rate and quality.

The residual solvent amount in a web is defined by the following formula.

Residual solvent amount (%)=(weight of a web prior to a heat treatment−weight of the web after the heat treatment)×100

Heat treatment during determination of the residual solvent amount refers to one carried out at 115° C. for one hour.

Peeling tension during peeling of film from the metal support is commonly 196-245 N/m. However, when wrinkles tend to result, it is preferable that peeling is carried out under a tension of at most 190 N/m. Further, during peeling, the lowest peeling tension is preferably at most 166.6 N, is more preferably at most 137.2 N/m, but is most preferably at most 100 N/m.

In the present invention, temperature in the peeling position on the above metal support is preferably regulated to −50-40° C., more preferably to 10-40° C., but most preferably to 15-30° C.

5) Drying and Stretching Processes

After peeling, the web is dried employing dryer 35 in which the web is alternately passed through a plurality of rollers installed in the web dryer and/or tenter stretching apparatus 34 which conveys a web while clipping both edges of the web.

In common drying means, heated air is blown onto both sides of the web. Means are also available in which heating is carried out via application of microwaves instead of air flow. Excessively rapid drying tends to deteriorate flatness of the finished film. High temperature drying is preferably carried out when the residual solvents reaches 8% by weight. Throughout the entire process, drying is carried out between about 40 to about 250° C., but is preferably carried out specifically between 40 to 160° C.

When a tenter stretching apparatus is employed, it is preferable to employ an apparatus which enables independent control of the film holding length (the distance from the holding initiation to the holding termination) at the right and the left. Further, during the tentering process, to improve flatness, it is preferable to intentionally provide zones which differ in temperature.

Further, it is also preferable to provide a neutral zone between temperature different zones so that adjacent zones result in no interference.

Stretching operation may be carried out in dividing into multiple stages. It is preferable to carry out biaxial stretching in the casting direction as well as in the lateral direction. Further, when biaxial stretching is carried out, simultaneous biaxial stretching may be employed, or it may be stepped stretching.

In the above case, "stepped" refers, for example, to a process in which it is possible to carry out sequential stretching which differs in stretching direction or in which it is possible to divide stepped stretching in the same direction and to add stretching in another direction in any of the steps. Namely, it is possible to employ, for example, the following stretching steps.

Stretching in the casting direction-stretching in the lateral direction-stretching in the casting direction-stretching in the casting direction Stretching in the lateral direction-stretching in the lateral direction-stretching in the casting direction-stretching in the casting direction Further, simultaneous biaxial stretching includes a case in which stretching is carried out in one direction and tension in another direction is relaxed to allow contraction. Stretching ratio of simultaneous biaxial streching is preferably in the range of a factor of 1.01-1.5 in the lateral and longitudinal directions.

When tentering is carried out, the residual solvent amount in a web is preferably 20-100% by weight at the initiation of tentering. It is preferable that until the residual solvents in the web reaches at most 10% by weight, drying is carried out while tentering. The above residual solvents in the web is more preferably at most 5% by weight.

Drying temperature during tentering is preferably 30-160° C., is more preferably 50-150° C., but is most preferably 70-140° C.

During the tentering process, in view of enhancement of film uniformity, it is preferable that temperature distribution in the lateral direction under any ambience is small. The temperature distribution in the lateral direction during the tentering process is preferably ±5° C., is more preferably ±2° C., but is most preferably ±1° C.

6) Winding Process

A winding process is one in which, after the residual solvent amount in the web reaches at most 2% by weight, as an acrylic film (a), the resulting web is wound by winder 37. By realizing the residual solvent amount to be 0.4% by weight, it is possible to prepare a film which exhibits excellent dimensional stability. It is particularly preferable that winding is carried out at a residual solvent amount of 0.00-0.10% by weight.

Commonly employed methods may be employed as a winding method, and include a constant torque method, a constant tension method, a tapered tension method, and an internal stress constant program tension control method. Any of these may be appropriately selected and employed.

The acrylic film (a) of the present invention is preferably a long-roll film. In practice, its length is about 100-about 5,000 m, and it is provided in a roll shape. Further, the film width is preferably 1.3-4 m, but is more preferably 1.4-2 m.

Thickness of the acrylic film (a) of the present invention is not particularly limited. When it is employed as the polarizing plate protective film, described below, the thickness is preferably 20-200 μm, is more preferably 25-100 μm, but is most preferably 30-80 μm.

<Cellulose Ester Films (b1) and (b2)>

Cellulose ester film (b1) of the present invention contains a cellulose ester resin, a plasticizer and other additive.

Cellulose ester film (b2) of the present invention contains a cellulose ester resin, a plasticizer, an acid acavenger and other additive.

<Cellulose Ester Resin>

The cellulose ester resin constituting the cellulose ester film of the present invention is an ester with a carboxylic acid having around 2-22 carbon atoms, and is preferably a lower carboxylic ester having 6 carbon atoms or less.

An acyl group bonding to a hydroxyl group may either be of a straight chain or a branched chain, or may form a ring. Further, the acyl group may be substituted by other substituent. The number of carbon atoms as aforementioned cellulose ester is preferably 2-4 and more preferably 2-3.

Specifically, as a cellulose ester utilized in the present invention, mixed fatty acid ester of cellulose in which a propionate group or a butyrate group other than an acetyl group is bonded, such as cellulose acetate propionate, cellulose acetate butyrate or cellulose acetate propionate butyrate may be employed.

Cellulose ester specifically preferably utilized in this invention is cellulose acetate, cellulose acetate butyrate, cellulose acetate propionate or cellulose acetate phthalate.

Cellulose ester other than cellulose acetate phthalate used in the present invention preferably satisfies equations (1) and (2), simultaneously.

$$2.0 \leq X+Y \leq 3.0 \qquad \text{Equation (1)}$$

$$0 \leq Y \leq 1.5 \qquad \text{Equation (2)}$$

wherein, X is a susbstitution degree of an acetyl group, Y is a substitution degree of an propionyl group, a butyryl group or mixed groups thereof.

Moreover, in order to obtain an optical characteristics matching with the object of the present invention, resins having different substitution degrees may be mixed. As the mixing ratio, 10:90 to 90:10 (in mass ratio) are preferable.

Among them, cellulose acetate propionate may be specifically preferably utilized. In cellulose acetate propionate, X is in $1.0 \leq X \leq 2.5$, and it is preferable that Y and X+Y are $0.1 \leq Y \leq 1.5$ and $2.0 \leq X+Y \leq 3.0$.

The number average molecular weight of the cellulose ester utilized in the present invention is preferably in a range of 60000 to 300000 in view of the mechanical strength of the prepared film. Those having a number average molecular weight of 70000 to 200000 are more preferably utilized.

The weight average molecular weight Mw and the number average molecular weight Mn of the cellulose ester are determined by a method described above.

The cellulose ester of the present invention such as cellulose acetate phthalate can be manufactured according to a known method. Specifically, the cellulose ester can be synthesized by referring the method described in JP-A No. 10-54804.

<Plasticizer of Cellulose Ester Film (b1)>

The plasticizer of cellulose ester (b1) of the present invention is characterized in that no phosphate plasticizer is contained. The phosphate plasticizer decomposes under a high temperature and fumid condition. As a result of the decomposition, phosphoric acid is generated, which accelerates the hydrolysis of cellulose ester and, further, cuts the bond of a dichroic dye constituting the polarizer, whereby fading of the polarizer occurs.

<Plasticizer of Cellulose Ester Film (b2)>

Examples of aphosphate plasticizer used in Cellulose ester film (b2) of the present invention include triphenyl phosphate (TPP), biphenyl diphenyl phosphate (BDP), tricresyl phosphate (TCP), trixylylenyl phosphate (TXP), cresyldiphenyl phosphate (CDP), 2-ethylhexyldiphenyl phosphate (EHDP), t-butylphenyl diphenyl phosphate (BDP), bis-(t-butylphenyl) phenyl phosphate (BBDP), tris(t-butylphenyl)phosphate (TBDP), isopropylphenyldiphenyl phosphate (IPP), bis-(isopropylphenyl)diphenyl phosphate (BIPP), tris(isopropyl phenyl) phosphate (TIPP), and triphenyl phosphate and biphenyldiphenyl phosphate are preferable.

As preferable plasticizers other than the phosphate plasticizer used for the cellulose ester film (b1) or (b2) of the present invention, there are cited at least one compound selected from an aromatic terminal polyester compound, an ester compound having one or more but 12 or less of at least one of a pyranose structure and a franose structure, provided that all or a part of OH groups in the structure are esterified, an acrylic polymer, a polyalcohol ester plasticizer, a polycarboxylic acid ester plasticizer (containing a citrate plasticizer) and a glycolate plasticizer.

The used amount of a phosphate plasticizer is 1-10 weight % based on the weight of the cellulose ester resin, and the used amount of other plasticizer is 1-50 weight % of the phosphate plasticizer.

<Aromatic Terminal Polyester Compounds>

In the present invention, an aromatic terminal polyester compound represented by following Formula (I) is preferably used.

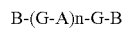   Formula (I)

(wherein B represents an aryl carboxylic acid residue, G represents an alkylene glycol residue having 2-12 carbon atoms, an aryl glycol residue having 6-12 carbon atoms or an oxyalkylene glycol residue having 4-12 carbon atoms, A represents an alkylene dicarboxylic acid residue having 4-12 carbon atoms or an aryl dicarboxylic acid residue having 6-12 carbon atoms, n represents an integer of 1 or more.)

The polyester compound is constituted by the arylcarboxylic acid residue represented by B, the alkylene glycol residue, the oxyalkylene glycol residue or the aryl glycol residue represented by G, and the alkylenedicarboxylic acid residue or the aryldicarboxylic acid residue represented by A; in Formula (I), and the compound can be obtained by a reaction similar to that for obtaining usual polyester compound.

Examples of an arylcarboxylic acid as a component of the aromatic terminal polyester compound used in the present invention include: benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid and acetoxybenzoic acid. They can be employed solely or in combination of two or more kinds.

The aromatic terminal polyester compound used in the present invention preferably has an n number of 1 or more but 100 or less, and a number average molecular weight of 300-1500 and more preferably 400-1000.

The aromatic terminal polyester compound represented by Formula (1) is preferably contained 0.5-30% by weight based on the weight of the cellulose ester.

Specific examples of am aromatic terminal polyester compound usable in the present invention will be shown below, however, the present invention is not limited thereto.

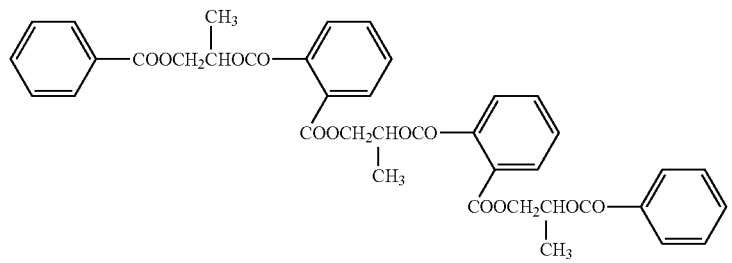

(1)

Mw: 696

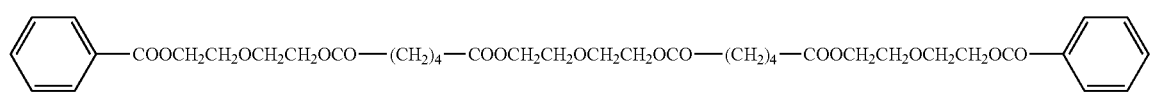

(2)

Mw: 746

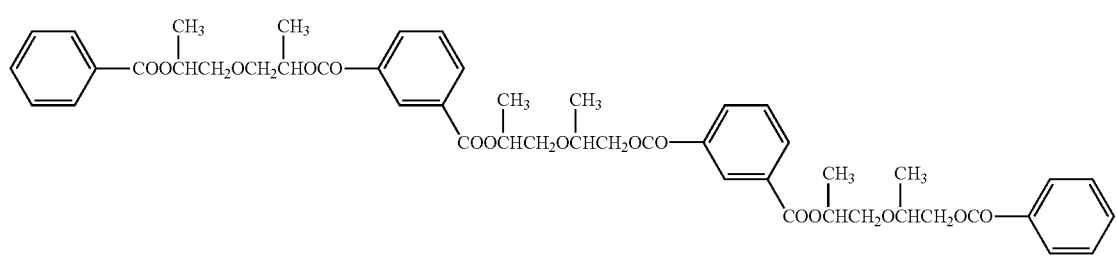

(3)

Mw: 830

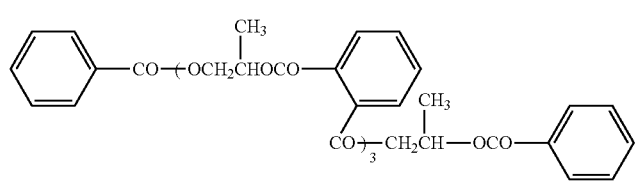

(4)

Mw: 886

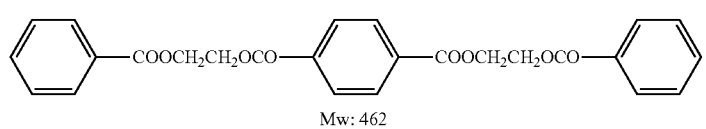

(5)

Mw: 462

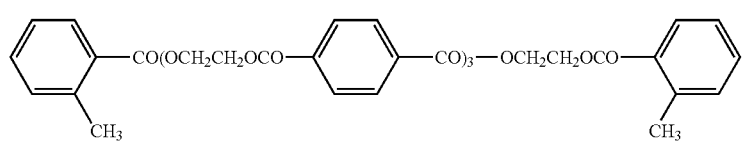

(6)

Mw: 874

<Ester Compound Having One or More but 12 or Less of at Least One of a Pyranose Structure and a Franose Structure, Provided that all or a Part of OH Groups in the Structure are Esterified>

The cellulose ester film of the present invention is characterized by containing an ester compound having one or more but 12 or less of at least one of a pyranose structure and a franose structure, provided that all or a part of OH groups in the structure are esterified.

With respect to the ratio of esterification, it is preferable that 70% or more of OH groups contained in the pyranose structure or the franose structure are esterified.

In the present invention, such ester compounds are also collectively referred to as saccharide ester compounds.

The aforementioned ester compound is a compound obtained by condensing one or more but 12 or less of at least one of a pyranose structure and a furanose structure represented by following Formula (A), wherein $R_{11}$-$R_{15}$ and $R_{21}$-$R_{25}$ each represent an acyl group having 2-22 carbon atoms or a hydrogen atom, m and n each represent an integer of 0-12, and m+n is an integer of 1-12.

Formula (A)

P:
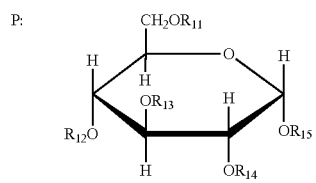

F:
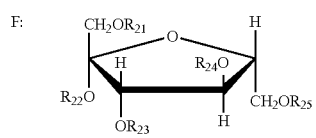

$R_{11}$ to $_{15}$, $R_{21}$ to $R_{25}$ each are preferably a benzoyl group or a hydrogen atom. The benzoyl group may further have substituent $R_{26}$ (p is 0-5) examples of which include such as an alkyl group, an alkenyl group, an alkoxy group and a phenyl group, and these alkyl group, alkenyl group and phenyl group may further have a substituent. The oligosaccharide can be prepared in a similar method to an esterified compound of the present invention.

Specific examples of an ester compound will be shown below, however, the present invention is not limited thereto.

1
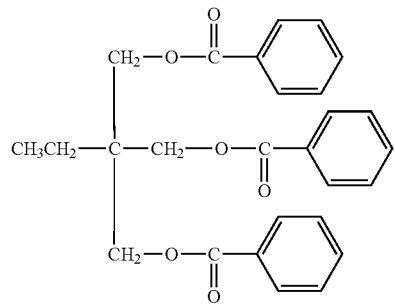

2
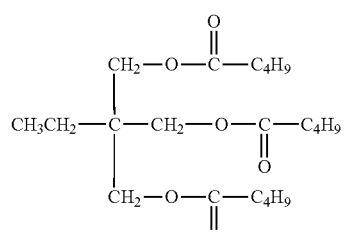

3
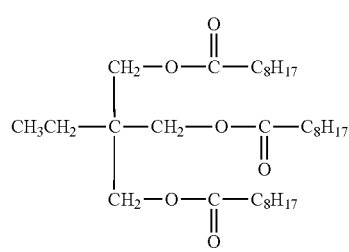

4
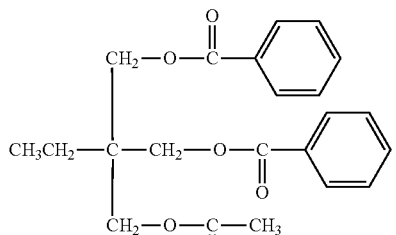

5
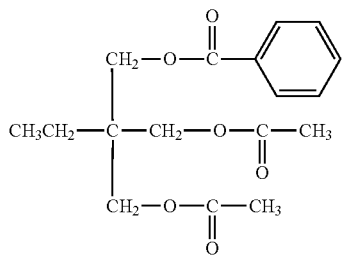

6
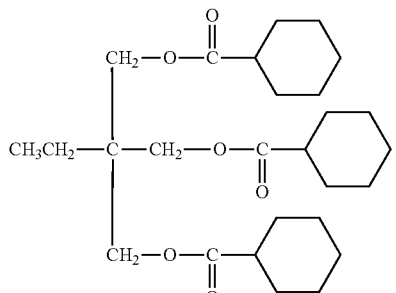

7
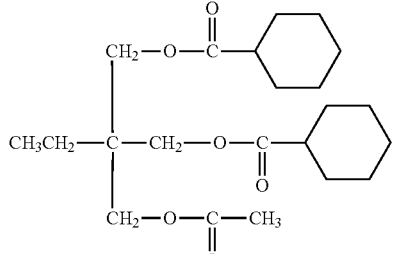

8
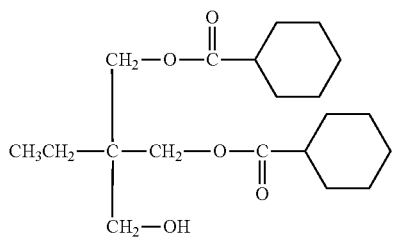

The cellulose ester film of the present invention preferably contains 0.5-30% by weight, and more preferably 5-30% by weight of a saccharide ester compound based on the weight of the cellulose ester film, in order to stabilize the display quality by suppressing the variation of retardation values.

The ratio of the aromatic terminal polyester compound represented by Formula (I) to the saccharide ester compound can be selected in the range of 99:1-1:99 in a weight ratio, and the total content of the both compounds is preferably 1 to 40% by weight based on the weight of the cellulose ester.

<Acrylic Polymer>

Cellulose ester films (b1) and (b2) of the present invention may contain a low molecular weight acrylic polymer.

The acrylic polymer employed in the present invention preferably has a function to show a negative birefringence in the stretching direction when incorporated in an optical film, and preferable is a polymer having a weight average molecular weight of 500-30000 obtained by polymerizing an ethylenically unsaturated monomer, although the structure is not specifically limited.

The acrylic polymer used in the present invention having a weight average molecular weight of 500 to 40000 may be an acrylic polymer having an aromatic group in a side chain or acrylic polymer having a cyclohexyl group in a side chain.

Good compatibility of the cellulose ester resin with the polymer having weight average molecular weight of the polymer of 500 to 30000 is obtained by controlling the component of the polymer.

The acrylic type polymer having an aromatic group in a side chain or the acrylic type polymer having a cyclohexyl group in a side chain is preferably has a weight average molecular weight of 500 to 10000 and these contribute to an excellent performance of the protective film for a polarizing plate such as excellent in transparency and very low moisture vapor permeability after cellulose ester film forming, in addition thereto.

The polymer has a weight average molecular weight of 500 to 30,000, which is considered between an oligomer and a low molecular weight polymer. It is difficult to control the molecular weight in the usual polymerization of these polymers, and it is preferable to employ a method to obtain uniform molecular weight not to make the molecular weight so large.

The acrylic polymer is preferably polymer X having a weight average molecular weight of 2000 to 30000 which is prepared by copolymerization of an ethylenic unsaturated monomer Xa having no aromatic ring nor hydroxy group in a molecule, and an ethylenic unsaturated monomer Xb having a hydroxy group but not aromatic ring, and an ethylenic unsaturated monomer other than Xa and Xb; or polymer Y having a weight average molecular weight of 500 to 5000 which is prepared by polymerization of an ethylenic unsaturated monomer Ya having no aromatic ring and an ethylenic unsaturated monomer which is polymerizable with Ya.

[Polymer X, Polymer Y]

In order to control Ro and Rt of the optical compensation film of the present invention, the polymer X having a weight average molecular weight of 2,000 to 30,000, which is prepared by copolymerization of ethylenically unsaturated monomer Xa containing no aromatic ring nor a hydroxyl or amide group in a molecule, ethylenically unsaturated monomer Xb containing a hydroxy or amide group but not aromatic ring in a molecule and a polymerizable ethylenic unsaturated monomer other than Xa and Xb; and the low molecular weight polymer Y having a weight average molecular weight of 500 to 5000 which is prepared by polymerization of an ethylenic unsaturated monomer Ya having no aromatic ring and an ethylenic unsaturated monomer which is polymerizable with Ya, are preferably contained.

Polymer X employed in the invention is a polymer having a weight average molecular weight of 2000 to 30000, which is prepared by copolymerization of ethylenically unsaturated monomer Xa containing no aromatic ring nor a hydroxy or amide group in a molecule, ethylenically unsaturated monomer Xb containing a hydroxy or amide group but not aromatic ring in a molecule and a polymerizable ethylenic unsaturated monomer other than Xa and Xb.

Xa is preferably an acryl or methacryl monomer having no aromatic ring and no hydroxyl or amide group in a molecule, and Xb is preferably an acryl or methacryl monomer having no aromatic ring but having a hydroxy or amide group, in a molecule.

Control of molecular weight is difficult in synthesizing such polymers X and Y, and it is preferable to employ a method by which polymer having a molecular weight of not so high and as uniform as possible is obtained.

The following methods can be cited as such the method of polymerizing polymers X and Y, method using a peroxide compound such as cumene peroxide and t-butyl hydroperoxide as the polymerization initiator, a method using a chain-transfer agent such as a mercapto compound or carbon tetra chloride additionally to the polymerization initiator, a method using a polymerization terminator such as benzoquinone and nitrobenzene, and a method described in JP-A 2000-128911 or 2000-344823 in which bulk polymerization is performed by using a polymerization catalyst such as a compound having one thiol group and a secondary hydroxyl group or a combination of such the compound and an organic metal compound is used as a polymerization catalyst.

Polymer Y is preferably polymerized by a method in which a compound having one thiol group and a secondary hydroxyl group is used as a chain transfer agent. The polymer Y has a hydroxyl group and a thioether group at polymer terminal resulted from the polymerization catalyst and chain transfer agent in this case. Compatibility of the polymer Y with the cellulose ester can be controlled by the terminal residues.

The hydroxyl value of polymer X and Y is preferably 30 to 150 mg KOH/g.

(Measurement of Hydroxyl Value)

The measurement of the hydroxyl value is based on JIS K 0070 (1992). This hydroxyl value is defined as mg number of potassium hydroxide which is required to neutralize acetic acid bonding to a hydroxyl group when 1 g of a sample is acetylated.

Practically, X g (approximately 1 g) of a sample is precisely weighed in a flask, which is added with exactly 20 ml of an acetylation agent (20 ml of acetic acid anhydride is added with pyridine to make 400 ml). The flask is equipped with an air condenser at the mouth and heated in a glycerin bath of 95 to 100° C. After 1 hour and 30 minutes, the system is cooled and added with 1 ml of purified water through the air condenser to decompose acetic acid anhydride into acetic acid.

Next titration with a 0.5 mol/L ethanol solution of potassium hydroxide was performed by use of a potentiometric titration apparatus to determine the inflection point of the obtained titration curve as an end point.

Further, as a blank test, titration without a sample is performed to determine the inflection point of a titration curve. A Hydroxyl value is calculated by the following Formula.

$$\text{Hydroxyl value} = \{(B-C) \times f \times 28.05/X\} + D$$

In the Formula, B is quantity (ml) of a 0.5 mol/L ethanol solution of potassium hydroxide utilized for a blank test, C is quantity (ml) of a 0.5 mol/L ethanol solution of potassium hydroxide utilized for titration, f is a factor of a 0.5 mol/L ethanol solution of potassium hydroxide, D is an acid value, and 28.05 is ½ of molar quantity 56.11 of potassium hydroxide.

The polymer X and polymer Y described above are both excellent in solubility with cellulose ester, productivity with minimized evaporation or volatilization, retention as the optical film, and dimensional stability with minimized moisture permeability.

Content of the polymer X and polymer Y used in the invention is preferably 5 to 20% by weight. The polymer X and polymer Y works sufficiently to adjust retardation value Rt when it is 5% by weight or more as the total amount in the total weight of the cellulose ester. Adhesive property with polarizer PVA is excellent when it is 20% by weight or less as the total amount.

The polymer X and polymer Y can be added directly to cellulose ester as the melt component.

<Polyalcohol Ester Plasticizers>

A polyalcohol ester plasticizer is a plasticizer which is constituted of an ester of an aliphatic polyalcohol of divalent or more and a monocarboxylic acid, and it preferably has an aromatic ring or a cycloalkyl ring in the molecule. It is preferably an ester of an aliphatic polyalcohol having a valence of 2-20.

The polyalcohol preferably used in the present invention is expressed by following Formula (a).

R1-(OH)n                   Formula (a)

wherein, R1 represents an organic group having a valence of n, n represents an integer of two or more. The OH group means an alcoholic or a phenolic hydroxyl group.

The molecular weight of the polyalcohol ester is not specifically limited, however, it is preferably 300-1500, and more preferably 350-750. A larger molecular weight is preferable because of a smaller volatility, while a smaller molecular weight is preferable in view of moisture permeability and compatibility with cellulose ester.

The carboxylic acid to be employed in the polyalcohol ester may be one kind or a mixture of two or more kinds of them. The OH groups in the polyhydric alcohol may be fully esterified or a part of OH groups may be left unreacted.

Specific examples of the polyalcohol ester will be listed below.

16

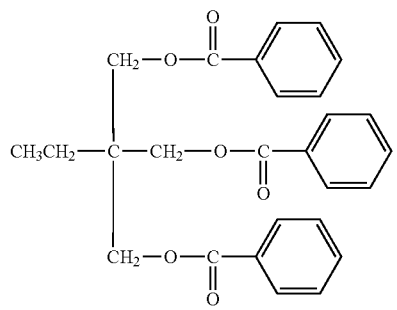

17

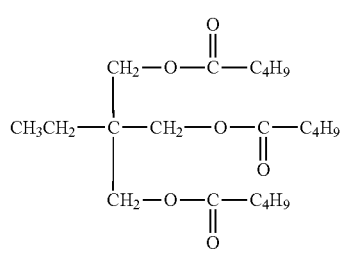

18

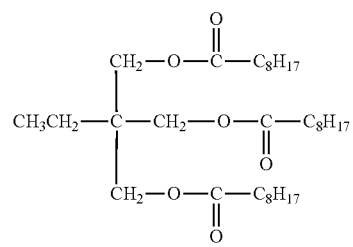

19

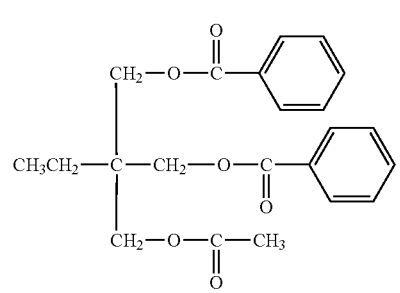

20

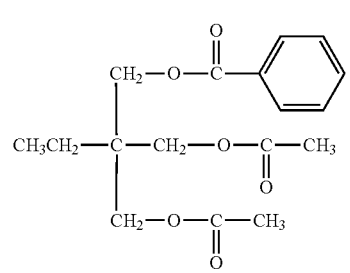

21

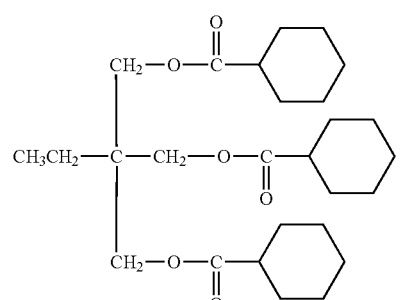

22

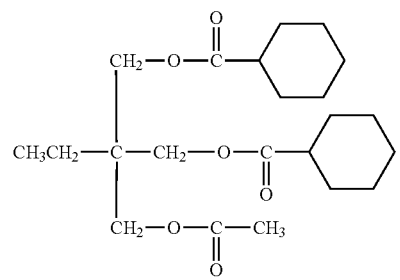

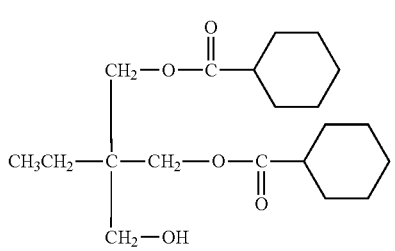

<Polycarboxylic Acid Ester Compounds>

A polycarboxylic acid ester compound is composed of an ester of a polycarboxylic acid of divalent or more, preferably of a valence of 2-20, and an alcohol. The valence of an aliphatic polycarboxylic acid is preferably 2-20, and, in the case of an aromatic polycarboxylic acid and an alicyclic polycarboxylic acid, the valence is preferably 3-20.

pounds (for example, those which have conventionally been employed together with vinyl chloride polymer compositions in vinyl chloride polymer compositions), epoxidized ether condensation products, diglycidyl ethers (namely, 4,4'-dihydroxydiphenyldimethylmethane) of bisphenol A, epoxidized unsaturated fatty acid esters (particularly, alkyl esters (for example, butyl epoxystearate) having about 2-about 4 carbon atoms of fat acids having 2-22 carbon atoms), epoxidized plant oils which can be represented and exemplified by compositions of various epoxidized long chain fatty acid triglycerides (for example, epoxidized soybean oil and epoxidized linseed oil and other unsaturated natural oils (these are occasionally called epoxidized natural glycerides or unsaturated fatty acid and these fatty acid have 12-22 carbon atoms).

Further, preferably employed as commercially available epoxy group incorporating epoxide resinous compounds maybe, for example, EPON 815C (produced by JAPAN EPOXY RESINS, Co., Ltd.), ADEKACIZERO-130P and ADEKACIZER O-180A (produced by ADEKA Corp.) and other epoxidized ether oligomer condensation products represented by Formula (E).

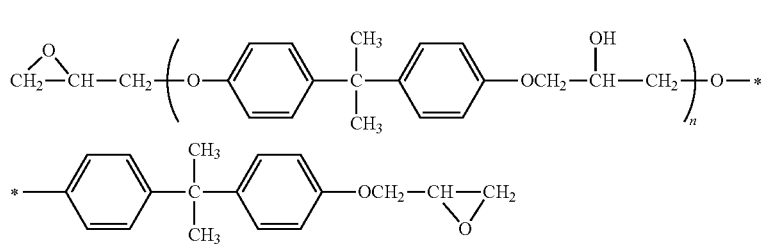

Formula (E)

<Citrate Plasticizers>

Examples of a citrate plasticizer include acetyltrimethyl citrate, acetyltriethyl citrate and acetyltributyl citrate.

Examples of an aliphatic acid ester plasticizer include butyl oleate, methyl acetyl ricinoleate, and dibutyl sebacate.

<Glycolate Plasticizers>

Although a glycolate plasticizer particular is not specifically limited, an alkyl phthalyl alkyl glycolate is preferably used.

Examples of a phthalate plasticizer include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl hexyl terephthalate.

(Acid Scavengers)

When a phosphate plasticizer is used in a cellulose ester, acid is isolated from the phosphoric acid under a high temperature and high humidity condition, and the decomposition of cellulose ester may be accelerated due to the presence of the acid. Accordingly, it is necessary that cellulose ester film (b2) of the present invention contains an acid scavenger as a stabilizer.

The acid scavenger may be employed without any limitation, as long as it is a compound which reacts with an acid to inactivate them. Of such compounds, preferred are compounds having an epoxy group, as disclosed in U.S. Pat. No. 4,137,201.

Epoxy compounds as an acid scavenger are known in this technical field, and include diglycidyl ethers of various polyglycols, specifically, polyglycols which are derived by condensation of ethylene oxides in an amount of about 8-about 40 mol per 1 mol of polyglycol, metal epoxy com- In the formula, n represent an integer of 0-12. Other usable acid scavengers include those described in paragraphs 87-105 of JP-A No. 5-194788.

The added amount of an acid scavenger is preferably 0.1-10 weight %, more preferably 0.2-5 weight %, but is more preferably 0.5-2 weight %. These may be employed in combinations of at least two types.

Further, acid scavengers may also be called acid trapping agent and acid catchers, but in the present invention, it is possible to use them regardless of the names.

<Other Additives>

It is preferable that, in the cellulose ester films (b1) and (b2) of the present invention, additives, for example, an antioxidant which prevents deterioration of a film, a UV absorber which provides a UV light absorption function, a matting agent (minute particles) which gives sliding property to a film, and a retardation regulator which adjusts the retardation of a film are preferably contained.

(Ultraviolet Absorber)

The cellulose ester films (b1) and (b2) according to the present invention may contain an ultraviolet absorber. An ultraviolet absorber is aimed to improve durability by absorbing ultraviolet rays not longer than 400 nm. Specifically, the transmittance of light at a wavelength of 370 nm is preferably 10% or less, more preferably 5% or less, and further more preferably 2% or less.

The ultraviolet absorber utilized in the present invention is not specifically limited and includes such as an oxybenzophnone compound, a benzotriazole compound, a sarycic acid ester compound, a benzophenone compound, a cyanoacrylate compound, a triazine compound, a nickel complex salt compound and an inorganic powder.

Further, a polymer ultraviolet absorber may also be preferably utilized as an ultraviolet absorber, and polymer type ultraviolet absorbents described in JP-A No. 6-148430 are specifically preferably utilized.

As an addition method of an ultraviolet absorber, a ultraviolet absorber may be added into a dope after having been dissolved in an organic solvent, for example, alcohols such as methanol, ethanol and butanol; organic solvents such as methylenechloride, methyl acetate, acetone and dioxane; and a mixed solvent thereof, or may be directly added into a dope composition.

Those insoluble in an organic solvent, such as inorganic powder, will be added into a dope after having been dispersed in an organic solvent and cellulose ester by use of such as a dissolver or a sand mill.

The using amount of an ultraviolet absorber is not uniform depending on a type and a using condition of an ultraviolet absorbent, however, in the case of the dry layer thickness of polarizing plate protective film of 30 to 200 μm, it is preferably 0.5 to 10 weight % and more preferably 0.6 to 4 weight %, based on the mass of the polarizing plate protective film.

(Antioxidant)

An antioxidant is also called as a deterioration-preventing agent. When a liquid crystal display is stored in a high temperature-high humidity condition, the cellulose ester film may be deteriorated.

An antioxidant is preferably contained in the foregoing cellulose ester film since an antioxidant has a function to retard or prevent decomposition of the cellulose ester film due to, for example, halogen contained in the residual solvent in the cellulose ester film or a phosphoric acid contained in a phosphoric acid-containing plasticizer.

Conventionally known antioxidant can be used in the present invention.

Preferably employed are a lactone-containing antioxidant, a sulfur-containing antioxidant, a phenol-containing antioxidant, a double bond compound-containing antioxidant, a hindered amine-containing antioxidant, and a phosphorus-containing antioxidant.

Preferable examples are those containing a chemical named "Irgafos XP40" or "Irgafos XP60" commercialized by Ciba Japan Inc.

The phenol compounds described above is preferably those having a structure of 2,6-diallyl phenol and listed are commercialized as "Irganox 1076" and "Irganox 1010" manufactured by Ciba Japan Inc. and "ADK STAB AO-50" from ADEKA Corp.

Examples of above-mentioned commercially available phosphorus-containing compounds include: "Sumilizer GP" from Sumitomo Chemical Co., Ltd.; "ADK STAB PEP-24", "ADK STAB PEP-36" and "ADK STAB 3010" from ADEKA Corp.; "IRGAFOS P-EPQ" from Ciba Japan Inc.; and GSY-P101 from SAKAI CHEMICAL INDUSTRY CO., LTD.

Hindered amine compounds of the above types are preferably those commercially available under trade names of, for example, "Tinuvin 144" and "Tinuvin 770" from Ciba Japan Inc., as well as under the trade names of "ADK STAB LA-52" from ADEKA Corp.

The above sulfur-containing compounds are preferably those commercially available under trade names of, for example, "Sumilizer TPL-R" and "Sumilizer TP-D" from Sumitomo Chemical Co., Ltd.

The above double bond compounds are preferably those commercially available under trade names of, for example, "Sumilizer GM" and "Sumilizer GS" from Sumitomo Chemical Co., Ltd.

The addition amount of the compound of antioxidant is determined optionally in accordance with the recycling process, and is usually added in the range of 0.05 to 20% by weight in general and preferably 0.1 to 1% by weight based on the weight of the resin which is major material of the film.

A synergy effects can be obtained by using several antioxidants of different types in combination rather than singly used. It is preferable, for example, combination of the lactone-containing antioxidant, phosphorus-containing antioxidant, phenol-containing antioxidant and double bond-containing antioxidant.

<Matting Agents>

The cellulose ester film (b1) or (b2) according to the present invention preferably contains particles as a matting agent.

With respect to the particles used in the present invention, examples of an inorganic compound include: silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate and calcium phosphate. Particles of an organic compound are also preferably used.

Examples of an organic compound include: pulverized and classified particles of, for example, polytetrafluoroethylene, cellulose acetate, polystyrene, polymethylmethacrylate, polypropylmethacrylate, polymethyl acrylate, polyethylene carbonate, an acrylic-styrene resin, a silicone resin, a polycarbonate resin, a benzoguanamine resin, a melamine resin, polyolefin powder, a polyester resin, a polyimide resin, polyethylenefluoride resin and starch.

A polymer compound, synthesized via a suspension polymerization, and a polymer compound or an inorganic compound formed into spheres via a spray-drying method or a dispersion method are also usable.

Particles containing silicon are preferable with respect to decreasing turbidity, and silicon dioxide is specifically preferable.

The mean diameter of primary particles of the particles is preferably from 5 to 400 nm, and more preferably from 10 to 300 nm.

The particles may preferably exist as aggregated secondary particles of diameters of from 0.05 to 0.3 μm. When the mean diameter of the primary particles is 100-400 nm, the particles may also be preferably contained as primary particles without aggregating.

The content of the particles in a polarizing plate protective film is preferably from 0.01 to 1% by weight, and is more preferably from 0.05 to 0.5% by weight. In a multi-layered polarizing plate protective film prepared by a co-casting method, a major part of the particles should preferably exist on the surface.

Particles of silicon dioxide are available on the market, for example, under trade names of AEROSIL R972, R927V, R974, R812, 200, 200V, 300, R202, OX50 and TT600 (manufacture by Nippon Aerosil Co., Ltd.)

Particles of zirconium oxide are available on the market, for example, under trade names of AEROSIL R976 and R811 (manufacture by Nippon Aerosil Co., Ltd.)

Particles of polymer available on the market include, for example: a silicone resin, a fluorine-contained resin and an acrylic resin. Among these, a silicone resin, especially a three dimensionally networked silicone resin is preferably used. Examples of such silicone resins include: TOSPERL 103, 105, 108, 120, 145, 3120 and 240, which are manufactured by Toshiba Silicone Co., Ltd.

Among the particles listed above, AEROSIL 200V and AEROSIL R972V are particularly preferable with respect to exhibiting a lower friction coefficient while maintaining the low turbidity of the polarizing plate protective film. The kinetic friction coefficient of at least one surface of the polarizing plate protective film used in the present invention is preferably 0.2-1.0.

Various additives may be added to a dope containing cellulose ester via batch mixing, or, alternatively, they may be added via in-line mixing using a separately prepared solution containing the additives. Specifically, particles are preferably added, partially or entirely via an in-line mixing, in order to reduce the load to a filter.

In an in-line mixing process of an additive solution, a smaller amount of cellulose ester is preferably dissolved in the dope in order to obtain a sufficiently mixed dope. The amount of cellulose ester is preferably from 1 to 10 weight parts and more preferably from 3 to 5 weight parts based on 100 weight parts of the solvent As a mixer for in-line addition and mixing, for example, a static mixer manufactured by Toray Engineering Co., Ltd. or a static type in-line mixer High-Mixer SWJ manufactured by Toray Industries, Inc., is preferably used.

<Retardation Adjusting Agent>

In the present invention, retardation is adjusted so that the cellulose ester film (b1) or (b2) can be used as an optically anisotropic layer. In order to obtain a preferable retardation value, it is preferable to use a well-known retardation adjusting agent.

The compound disclosed in JP-A No. 2007-155972 can also be preferably used.

<Production Method of Cellulose Ester Films (b1) and (b2)>

Next, the production method of cellulose ester films (b1) and (b2) of the present invention will be explained.

As the cellulose ester films (b1) and (b2), either of the films produced by a solution casting method and a melt casting method are preferably used.

Production of the cellulose ester films (b1) and (b2) of the present invention is carried out via a process to dissolve cellulose ester and additives in a solvent to prepare a dope, a process to cast the dope on an infinitively moving endless metal support, a process to dry the cast dope to make a web, a process to peel the web from the metal support, a process to stretch the web or to hold the width, a process to further drying the web, and a process to wind up the finished film.

A process to prepare a dope will be now described. The concentration of cellulose ester in a dope is preferably the higher with respect to decreasing a drying load after the dope has been cast on a metal support, while filtering precision will be deteriorated due to an increased load at the time of filtering when the concentration of cellulose ester is excessively high. The concentration to balance these is preferably 10-35 weight % and more preferably 15-25 weight %.

A solvent utilized in a dope of this invention, one type alone or at least two types in combination may be utilised, however, a good solvent and a poor solvent of cellulose ester are preferably utilized in combination with respect to producing efficiency.

A preferable range of a mixing ratio of a good solvent to a poor solvent is 70-98 weight % of good solvent to 2-30 weight % of a poor solvent. As a good solvent and a poor solvent, one dissolves utilized cellulose ester by itself alone is defined as a good solvent and one swells or can not dissolve cellulose ester alone is defined as a poor solvent.

Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate; while it becomes a poor solvent for acetic ester of cellulose (an acetyl substitution degree of 2.8) of cellulose.

A good solvent utilized in the present invention is not specifically limited, however, includes an organic halogen compound such as methylene chloride, dioxoranes, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope is preferably contains 0.01-2 weight % of water.

The solvent removed from the film by drying in the film forming process is recovered and reused as the solvent used for dissolving a cellulose ester.

In the recovered solvent, a small amount of, for example, a plasticizer, a UV absorber, a polymer component or a monomer component may be contained. The solvent can be preferably used even when these materials are contained, or, alternatively, the solvent may be purified, if necessary, to reuse.

As a dissolution method of cellulose ester at the time of preparation of the dope described above, a general method can be employed. By a combination of heating and increased pressure, it is possible to heat up to a temperature higher than the boiling point of the solvent under an ordinary pressure.

It is preferable to dissolve the cellulose ester while stirring, by heating up to a temperature higher than the boiling point of the solvent under an ordinary pressure but in the temperature range in which the solvent does not boil under the increased pressure, because generation of a granular insoluble residue, which is called as gel or flocculates, is prevented.

Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside, and for example, jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high.

The heating temperature is preferably 45-120° C. more preferably 60-110° C. and furthermore preferably 70-105° C. Further, the pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small.

Therefore, the absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no exfoliation of fiber of a filter medium.

It is preferable to eliminate or reduce impurities having been contained in cellulose ester as a raw material, specifically foreign matter causing a bright spot defect by filtration.

Foreign matter causing bright spot defects means a spot (foreign matter) which is visible due to light leak, when two sheets of polarizing plates, between which an optical film is placed, are arranged in a crossed nicols state, and light is irradiated from one of the polarizing plate side to be observed from the other polarizing plate side. The number of bright spots having a diameter of not less than 0.01 mm is preferably not more than 200 spots/cm$^2$.

The number of bright spots having a diameter of not less than 0.01 mm is more preferably not more than 100 spots/cm$^2$, further more preferably not more than 50 spots/cm$^2$, still more preferably 0-10 spots/cm$^2$. Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures between before and after filtering (referred to as a pressure difference).

The preferable temperature is 45-120° C., more preferably 45-70° C. and furthermore preferably 45-55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is minor finished, and a stainless steel belt or a drum made of castings, the surface of which is plating finished, is utilized.

The cast width can be set to 1-4 m. The surface temperature of a metal support in a cast process is from −50° C. to a temperature lower than the boiling point of a solvent. It is preferable the temperature is the higher since a drying speed of a web can be set faster, however, excessively high temperature may sometimes cause foaming of a web or deterioration of flatness.

The support temperature is preferably 0-55° C. and more preferably 25-50° C. It is also a preferable method to make a web gelled by cooling and to peel off the web from a drum while the web contains a larger amount of residual solvent.

The method to control the temperature of a metal support is not specifically limited; however, there are a method to blow a hot wind or a cold wind on the web and a method to make hot water contact the rear side of a metal plate. A method to utilize hot water is preferable because time required to make a metal support become a constant temperature is short due to more efficient heat conduction. In the case of employing a hot wind, a wind of a temperature higher than the aimed temperature may be employed.

To provide a good flatness of cellulose ester films (b1) and (b2), the residual solvent amount at the time of peeling a web from a metal support is preferably 10-150 weight %, more preferably 20-40 weight % or 60-130 weight % and specifically preferably 20-30 weight % or 70-120 weight %.

In the present invention, a residual solvent amount is defined by the following equation.

Residual solvent amount (mass %)=$\{(M-N)/N\} \times 100$

Herein, M is a weight of a sample picked at an arbitrary time during or after manufacturing of a web or film and N is a weight after heating M at 115° C. for 1 hour.

Further, in a drying process of a cellulose ester films (b1) and (b2), a web is preferably peeled from a metal support and further dried to make a residual solvent amount of not more than 1 weight %, more preferably not more than 0.1 weight % and specifically preferably 0-0.01 weight %.

In a film drying process, a roll drying method (in which a web is dried while being alternately passed through many rolls which are arranged up and down) or a method to thy a web while being transported by a tenter method will be applied.

To prepare cellulose ester films (b1) and (b2) of the present invention, it is specifically preferable that a web is stretched in the width direction (the lateral direction) by means of a tenter method to grip the both edges of the web by such as clips. The peeling tension is preferably 300 N/m or less.

A means to dry a web is not specifically limited, and it can be generally performed by such as a hot wind, infrared rays, a heat roll and microwaves, however, preferably performed by a hot wind in view of convenience.

A drying temperature in a drying process of a web is preferably raised step-wise in a range of 40-200° C.

The layer thickness of the cellulose ester films (b1) and (b2) is not specifically limited; however, a layer thickness of 10 to 200 μm is applied. The layer thickness is specifically preferably 10-100 μm and furthermore preferably 20 to 60 μm.

The cellulose ester films (b1) and (b2) of the present invention have a width of 1 to 4 m. The width is preferably 1.4 to 4 m and specifically preferably 1.6 to 3 m. When the width exceeds 4 m, the transportation becomes difficult.

In order to obtain the retardation values Ro and Rt desired in the present invention, it is preferable that the cellulose ester films (b1) and (b2) have the constitution of the present invention and, further, are subjected to refractive index control by means of control of conveyance tension or stretching.

The retardation value can be varied by increasing or decreasing the tension along the longitudinal direction.

It is also possible to perform uniaxial stretching or sequential or simultaneous biaxial stretching in the longitudinal direction of the film (the cast direction) and in the direction perpendicular thereto in the film plane, namely, in the width direction.

The stretching ratios in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., more preferably 150° C. to 200° C., still more preferably higher than 150° C. and not higher than 190° C.

It may be preferable to stretch a film under the condition where the content of the residual solvent in the film is 20 to 0%, and more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of the residual solvent is lower than 1% at 160° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edges of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of course, these methods may be used in combination.

In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of the cellulose ester films (b1) and (b2) of the present invention preferably is present in a film plane and $\theta 1$ is preferably not less than $-1°$ and not more than $+1°$, and more preferably not less than $-0.5°$ and not more than $+0.5°$, provided that $\theta 1$ represents the angle against the casting direction.

This $\theta 1$ can be defined as an orientation angle, and measurement of $\theta 1$ can be performed by use of automatic birefringent meter KOBRA-21ADH (Oji Scientific Instruments). To satisfy the above-described relationships by $\theta 1$ can contributes to obtain a high luminance and to restrain or prevent light leak, and to obtain faithful color reproduction in a color liquid display.

(Physical Properties of Cellulose Ester Films (b1) and (b2))

The moisture permeability of the cellulose ester films (b1) and (b2) according to the present invention is preferably 450 to 1,800 g/m²·24 h, more preferably 500 to 1,500 g/m²·24 h and specifically preferably 500 to 1300 g/m²·24 h at 40° C., 90% RH. The moisture permeability can be measured according to a method described in JIS Z 0208 (1976).

The rupture elongation of the cellulose ester films (b1) and (b2) according to the present invention is preferably 10 to 80% and more preferably 20 to 50%.

The visible light transmittance of the cellulose ester films (b1) and (b2) according to the present invention is preferably not less than 90% and more preferably not less than 93%.

In the haze measurement of the film using a haze meter, it is preferable that the haze observed by using, as an interface, a solvent having a refractive index of ±0.05 of the film refractive index is 0.02 or less.

An internal haze means a haze caused by a scattering factor existing in the inside of the film, and the inside means a portion of the film which is 5 μm or more inside from the surface.

The internal haze can be measured using a haze meter in the condition in which the surface haze can be reduced as small as possible by dropping a solvent having a refractive index of ±0.05 of the film refractive index, such as glycerin, on the film interface.

Employed may be a haze meter Type: NDH 2000 (product by Nippon Denshoku Industries Co., Ltd.) having a 5V9W halogen lamp as a light source and a silicon photo cell (attached with a relative luminous efficiency filter) as a photo receiver.

Further, a retardation value further in a wider range can be acquired by applying a liquid crystal layer on the cellulose ester films (b1) and (b2) of the present invention.

<Production of Polarizing Plate>

A polarizer, which is a major constitutional component of the polarizing plate, is an element which transmits light in a polarized wave plane in a specific direction. The representative polarizing film, which is presently known, is a polyvinyl alcohol based polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by a durability enhancing treatment, by preferably employing boron compounds.

The acrylic film (a) of the present invention is adhered to a polarizer with, for example, an adhesive. It is preferable to employ an adhesive agent used in an adhesive layer so that at least one portion of the adhesive layer exhibits a storage elastic modulus in the range of $1.0 \times 10^4$-$1.0 \times 10^9$ Pa at 25° C. Curing type adhesive agents are appropriately employed, which form high molecular weight compounds, or crosslinking structures via various chemical reactions after coating the above adhesives and adhering.

Specific examples thereof include such as urethane based adhesive agents, epoxy based adhesive agents, aqueous polymer-isocyanate based adhesive agents, curing type adhesive agents such as a thermally curing type acrylic adhesive agent, moisture curing urethane adhesive agents, anaerbiotic adhesive agents such as polyether methacrylate types, ester based methacrylate types, or oxidation type polyether methacrylates, cyanoacrylate based "instant" adhesive agents, and acrylate and peroxide based dual liquid type "instant" adhesive agents.

The above adhesive agents may be either of a single liquid type, or of a type such that prior to use, at least two liquids are blended.

Further, the above adhesive agents may be of a solvent based type in which organic solvents are employed as a medium, of an aqueous type such as an emulsion type, a colloid dispersion type, or an aqueous solution type in which media are composed of water as a major component, or may be of a non-solvent type. Concentration of the above adhesive agent solution may be appropriately determined depending on the film thickness after adhesion, the coating method, and the coating conditions, and is commonly 0.1-50% by weight.

The cellulose ester films (b1) and (b2) of the present invention are closely adhered to a polarizer using a polyvinylalcohol adhesive agent, after being subjected to a saponification treatment according to a common method.

The acrylic film (a) and the cellulose ester film (b1) or (b2) may be simultaneously adhered to a polarizer or may be adhered with a role-to-role manner in a rolled state.

<Liquid Crystal Displays>

The polarizing plate of the present invention is adhered to a liquid crystal cell through an adhesive layer, in which the polarizing plate of the present invention is adhered on the viewer's side of the liquid crystal cell. Further, the polarizing plate is adhered to the liquid crystal cell so that cellulose ester film (b1) or (b2) faces the liquid crystal cell.

The polarizing plate according to the present invention is preferably employed in a reflection type, transparent type, or semi-transparent type LCD, or in various driving mode LCDs such as a TN type, an STN type, an OCB type, an HAN type, a VA type (a PVA type and an MVA type), and an IPS type (including an FFS system). Specifically in a large screen display device, particularly a screen of at least 30 size, especially of 30-54 size, no white spots occur at the periphery of the screen and its effect is maintained over an extended duration.

EXAMPLES

The present invention will now be specifically described with reference to examples, however the present invention is not limited thereto.

Example 1

Following Acrylic Resins A1-A7, and MS1 and MS2 were prepared via methods known in the art.

A1: monomer weight ratio (MMA:MA=98:2), Tg 103° C., Mw 70000
A2: monomer weight ratio (MMA:MA=97:3), Tg 102° C., Mw 160000
A3: monomer weight ratio (MMA:MA=97:3), Tg 102° C., Mw 350000
A4: monomer weight ratio (MMA:MA=97:3), Tg 102° C., Mw 550000
A5: monomer weight ratio (MMA:MA=97:3), Tg 102° C., Mw 800000
A6: monomer weight ratio (MMA:MA=97:3), Tg 102° C., Mw 930000
A7: monomer weight ratio (MMA:MA=94:6), Tg 99° C., Mw 1100000
MS1: monomer weight ratio (MMA:ST=60:40), Tg 103° C., Mw 100000
MS2: monomer weight ratio (MMA:ST=40:60), Tg 102° C., Mw 100000

Further, the following commercially available ones were used.

DIANAL BR50 (produced by Mitsubishi Rayon Co., Ltd.) Tg 100° C., Mw 100000
DIANAL BR52 (produced by Mitsubishi Rayon Co., Ltd.) Tg 105° C., Mw 85000
DIANAL BR80 (produced by Mitsubishi Rayon Co., Ltd.) Tg 105° C., Mw 95000
DIANAL BR83 (produced by Mitsubishi Rayon Co., Ltd.) Tg 105° C., Mw 40000
DIANAL BR85 (produced by Mitsubishi Rayon Co., Ltd.) Tg 105° C., Mw 280000
DIANAL BR88 (produced by Mitsubishi Rayon Co., Ltd.) Tg 105° C., Mw 480000
80N (produced by Asahi Chemicals Co. Ltd.) Tg 110° C., Mw 100000

In the above commercially available acrylic resins (A), the ratio of MMA unit was around 30 weight % in DIANAL BR50, around 70 weight % in DIANAL BR52, and 90 weight %-99 weight % in each of DIANAL BR80-80N.

[Production of Acrylic Film (a))
<Production of Acrylic Film (a) 1>

| (Dope Composition 1) | |
|---|---|
| DIANAL BR85 (produced by Mitsubishi Rayon Co., Ltd.) | 70 weight parts |
| Cellulose ester (CE1) | 30 weight parts |
| Methyl methacrylate | 300 weight parts |
| Ethanol | 40 weight parts |

The above compounds were thoroughly dissolved while heating to prepare a dope.

(Preparation of Acrylic Resin Film)

The dope prepared as above was uniformly cast onto a 2 m wide stainless steel band support at 22° C., employing a belt casting apparatus. Solvents were evaporated on the stainless steel band support so that the residual solvent amount reached 100%, and the resulting film was peeled from the stainless steel band with a peeling tension of 162 N/m.

The peeled acrylic resin web was heated at 35° C. to evaporate solvents and was slit to a 1.6 m width. Thereafter, while being stretched by a factor of 1.1 in the lateral direction with a tenter, drying was carried out at a drying temperature of 135° C. When stretching was initiated with the tenter, the amount of residual solvents was 10%.

After the tenter stretching, relaxation was conducted for 5 minutes at 130° C. Thereafter, drying was completed via conveyance through 120° C. and 140° C. drying zones employing a lot of rollers, and slitting was carried out for a 1.5 m width. Subsequently, a knurling treatment of a width of 10 mm and a height of 5 μm was applied to both edges, followed by winding onto a core of an internal diameter of 15.24 cm under an initial tension of 220 N/m and a final tension of 110 N/m, whereby acrylic film (a) 1 was obtained.

The stretching magnitude in the MD direction, calculated based on the rotation rate of the stainless steel band support and the driving rate of the tenter, was at a factor of 1.1.

The residual solvent amount, film thickness and roll length of acrylic film (a) 1, described in Table 1, were 0.1%, 60 μm, and 4000 m, respectively.

<Preparation of Acrylic Films (a) 2-42 and Comparative Films>

Acrylic films (a) 2-42 and comparative films 43-45 were prepared in the same manner as above acrylic film (a) 1, except that kinds and composition ratios of acrylic resin (A) and cellulose ester resin (B) were changed as listed in Tables 1 and 2.

TABLE 1

| | Acyl substitution degree | | | | | | Total substitution degree | Mw |
|---|---|---|---|---|---|---|---|---|
| CE | ac | p | b | bz | pen | ph | | |
| 1 | 0.19 | 2.56 | | | | | 2.75 | 200000 |
| 2 | 0.19 | 2.56 | | | | | 2.75 | 210000 |
| 3 | 0.19 | 2.56 | | | | | 2.75 | 250000 |
| 4 | 0.19 | 2.56 | | | | | 2.75 | 85000 |
| 5 | 0.30 | | 2.30 | | | | 2.60 | 160000 |
| 6 | 0.50 | 1.20 | 1.20 | | | | 2.90 | 180000 |
| 7 | 1.00 | 1.50 | | | | | 2.50 | 120000 |
| 8 | 1.00 | | 1.50 | | | | 2.50 | 150000 |
| 9 | 1.08 | | 1.84 | | | | 2.92 | 230000 |
| 10 | 1.20 | | | 1.30 | | | 2.50 | 120000 |
| 11 | 1.41 | 1.32 | | | | | 2.73 | 200000 |
| 12 | 1.50 | | | 1.30 | | | 2.80 | 244000 |
| 13 | 1.50 | | | | 1.30 | | 2.80 | 192000 |
| 14 | 0.19 | 2.56 | | | | | 2.75 | 70000 |
| 15 | 0.19 | 2.56 | | | | | 2.75 | 290000 |
| 16 | 0.30 | 1.50 | | | | | 1.80 | 130000 |
| 17 | 1.00 | | 1.50 | | | | 2.50 | 40000 |
| 18 | 1.05 | 1.00 | | | | | 2.05 | 180000 |
| 19 | 1.50 | | 0.70 | | | | 2.20 | 145000 |
| 20 | 1.92 | 0.74 | | | | | 2.66 | 178000 |
| 21 | 2.00 | 0.50 | | | | | 2.50 | 220000 |
| 22 | 2.90 | | | | | | 2.90 | 200000 |
| 23 | 2.12 | | 0.74 | | | | 2.86 | 204000 |
| 24 | 1.20 | | | | | 1.30 | 2.50 | 110000 |
| 25 | 1.20 | | | | | 1.30 | 2.50 | 160000 |

TABLE 2

| Acrylic film No. | Acrylic film (a) | | | | Moisture permeability g/m²·24 hr | Haze (%) | Tension softening point (°C.) | Ductile fracture |
|---|---|---|---|---|---|---|---|---|
| | Acrylic resin (A) | | Cellulose ester resin (B) | | | | | |
| | Kind | Weight parts | CE kind | Weight parts | | | | |
| a1 | BR85 | 70 | 1 | 30 | 300 | 0.22 | 121 | A |
| a2 | | 95 | 1 | 5 | 105 | 0.22 | 104 | A |
| a3 | | 88 | 1 | 12 | 117 | 0.21 | 110 | A |
| a4 | | 52 | 1 | 48 | 480 | 0.31 | 131 | A |
| a5 | | 35 | 1 | 55 | 850 | 0.37 | 135 | A |
| a6 | | 28 | 1 | 72 | 1200 | 0.65 | 136 | A |
| a7 | | 70 | 2 | 30 | 310 | 0.26 | 120 | A |
| a8 | | 70 | 3 | 30 | 290 | 0.33 | 122 | A |
| a9 | | 70 | 4 | 30 | 315 | 0.28 | 118 | A |
| a10 | | 70 | 5 | 30 | 350 | 0.27 | 113 | A |
| a11 | | 70 | 6 | 30 | 290 | 0.26 | 120 | A |
| a12 | | 70 | 7 | 30 | 360 | 0.34 | 125 | A |
| a13 | | 70 | 8 | 30 | 280 | 0.21 | 115 | A |
| a14 | | 70 | 9 | 30 | 260 | 0.19 | 113 | A |
| a15 | | 70 | 10 | 30 | 250 | 0.42 | 125 | A |
| a16 | | 70 | 11 | 30 | 350 | 0.45 | 129 | A |
| a17 | | 70 | 12 | 30 | 240 | 0.42 | 124 | A |
| a18 | | 70 | 13 | 30 | 250 | 0.32 | 110 | A |
| a19 | | 70 | 14 | 30 | 300 | 0.22 | 118 | B |
| a20 | | 70 | 15 | 30 | 290 | 1.20 | 123 | A |
| a21 | | 70 | 16 | 30 | 330 | 1.30 | 119 | A |
| a22 | | 70 | 17 | 30 | 290 | 0.31 | 109 | B |
| a23 | | 70 | 18 | 30 | 350 | 1.70 | 121 | A |
| a24 | | 70 | 19 | 30 | 360 | 1.10 | 123 | A |
| a25 | | 70 | 20 | 30 | 360 | 1.30 | 127 | A |
| a26 | | 70 | 21 | 30 | 370 | 1.20 | 129 | A |
| a27 | | 70 | 22 | 30 | 380 | 1.40 | 135 | A |
| a28 | | 70 | 23 | 30 | 380 | 2.10 | 131 | A |
| a29 | | 70 | 24 | 30 | 280 | 1.50 | 125 | A |
| a30 | | 70 | 25 | 30 | 280 | 1.70 | 126 | A |
| a31 | BR80 | 70 | 1 | 30 | 300 | 0.33 | 120 | A |
| a32 | BR83 | 70 | 1 | 30 | 300 | 0.32 | 118 | B |
| a33 | BR88 | 70 | 1 | 30 | 300 | 0.35 | 123 | A |
| a34 | A1 | 70 | 1 | 30 | 300 | 0.33 | 116 | B |
| a35 | A2 | 70 | 1 | 30 | 300 | 0.25 | 121 | A |
| a36 | A3 | 70 | 1 | 30 | 300 | 0.26 | 123 | A |
| a37 | A4 | 70 | 1 | 30 | 290 | 0.36 | 123 | A |
| a38 | A5 | 70 | 1 | 30 | 290 | 0.51 | 122 | A |
| a39 | A6 | 70 | 1 | 30 | 280 | 0.64 | 121 | A |
| a40 | A7 | 70 | 1 | 30 | 280 | 1.07 | 121 | A |
| a41 | MS1 | 70 | 1 | 30 | 240 | 0.48 | 119 | A |
| a42 | MS2 | 70 | 1 | 30 | 190 | 0.89 | 120 | A |
| a43 | | | B-1** | | 3 | 0.30 | 125 | A |
| a44 | | | B-2** | | 20 | 1.20 | 90 | A |
| a45 | | | B-3** | | 92 | 0.50 | 135 | A |

Further, with respect to the acyl groups of the cellulose ester resins listed in Tables 1 and 2, "ac" represents an acetyl group, "p" represents a propionyl group, "b" represents a butyryl group, "pen" represents a pentanoyl group, "bz" represents a benzoyl group, and "ph" represents a phthalyl group.

<Preparation of Acrylic Film 201: Comparative Example of Non-Compatible Acrylic Film>

Acrylic Film 201 which was an acrylic film was prepared in the same manner as above Acrylic Film 1, except that the dope composition was changed as described below.

| (Dope Liquid Composition 201) | |
|---|---|
| DIANAL BR85 (produced by Mitsubishi Rayon Co., Ltd.) | 70 weight parts |
| Cellulose ester CE1 | 30 weight parts |
| Methylene chloride | 140 weight parts |
| Toluene | 200 weight parts |

Further, the glass transition temperature of prepared Optical Film 51 was determined via a differential scanning calorimeter (Type DSC-7, produced by Perkin Elmer Co.). Peaks were detected in two positions at Tg1 of 105° C. and Tg2 of 145° C., and it was found that acrylic rein (A) and cellulose ester resin (B) were present in a non-compatible state.

[Preparation of Cellulose Ester Film (b1)]

As cellulose ester films (b1), those listed in Table 3 were used.

(b1)-1 through (b1)-4 are cellulose ester films KC4UY, KC8UX and KC4UE each produced by Konica Minolta Opto. Inc., and only KC4UY contains a phosphate plasticizer.

(b1)-5 was prepared in accordance with film 17 disclosed in Example 6 of JP-A No. 2005-272800 (containing a phosphate plasticizer), (b1)-6 was prepared in accordance with Sample 1 in JP-A No. 2007-106794 and (b1)-7 was prepared in accordance with CF-1 in Table 2 of JP-A No. 2008-102475 (containing a phosphate plasticizer).

TABLE 3

| Cellulose ester film (b1) | Film | Existence of phosphate plasticizer |
|---|---|---|
| 1 | KC4UY | no |
| 2 | KC8UX | yes |
| 3 | KC4UE | no |
| 4 | KC4FR | no |
| 5 | Film 17 disclosed in Example 6 of JP-A No. 2005-272800 | yes |
| 6 | Sample 1 disclosed in Example 1 of JP-A No. 2007-106794 | no |
| 7 | Film CF-1 disclosed in Table 2 of JP-A No. 2008-102475 | yes |

<<Evaluation Method>>

Obtained acrylic films (a) 1-42, and comparative films 43-45 were subjected to the following evaluation.

(Moisture Permeability)

According to the method of JIS Z-0208, each film sample was subjected to moisture conditioning at 40° C. under 90% RH and, using a moisture permeability measuring instrument, the amount of water per unit area (g/m$^2$) was calculated. The moisture permeability was obtained as the value of "weight of the film after moisture conditioning"–"weight of the film before moisture conditioning".

(Haze: Evaluation of Transparency)

The haze of each film produced as above was determined using a haze meter (NDH2000, produced by Nippon Denshoku Industries Co., Ltd.), according to the method of JIS K-7136.

(Tension Softening Point: Evaluation of Heat Resistance)

A specimen being subjected to moisture conditioning at 23° C. under 55% RH for 24 hours was cut into 120 mm (longitudinal)×10 mm (width) under the same condition. Using a TENSIRON tester (RTC-1225A, produced by ORIENTEC Co., Ltd.), the temperature was raised at a rate of 30° C./minute, while pulling the resulting sheet under a tension of 10 N, and the temperature at which the tension decreased to 9N was determined. The measurement was conducted three times and an average value was calculated.

(Ductile Fracture: Brittleness Evaluation)

A specimen being subjected to moisture conditioning at 23° C. under 55% RH for 24 hours was cut into 100 mm (longitudinal)×10 mm (width) under the same condition. The resulting sheet was subjected to one mountain fold and one valley fold in the longitudinal direction at the central portion with a curvature radius of 0 mm and a folding angle of 180° so that the folded films were precisely piled. The above test was carried out three times, and evaluation was made based on the following criteria. Incidentally, "rupture", as described in the evaluation, means that the sheet is separated into at least two pieces.

A: no rupture was observed during the three tests
B: at least one rupture was observed during the three tests (Evaluation of Properties as Liquid Crystal Display)

<Preparation of Polarizing Plate>

A polarizing plate, in which each acrylic film (a) and cellulose ester film (b1) were employed as polarizing plate protective films, was prepared as follows.

A 120 μm thick polyvinyl alcohol film in a long-length roll was immersed into 100 weight parts of an aqueous solution incorporating 1 weight part of iodine and 4 weight parts of boric acid and was stretched at 50° C. by a factor of 5 in the conveying direction, whereby a polarizer was prepared.

Subsequently, the above polarizing film, onto which an acrylic adhesive agent was applied, was adhered onto the acrylic film (a) prepared in Example 1, which had been subjected to a corona treatment.

Further, cellulose ester film (b1) treated with an alkali saponification treatment was adhered onto the other side, followed by drying, whereby a polarizing plate was prepared.

<Fabrication of Liquid Crystal Display>

Display characteristics of acrylic films (a) were evaluated employing each of the polarizing plats prepared as above.

Polarizing plates on both sides, adhered to 32 sized television AQ-32AD5, manufactured by Sharp Corp., were peeled away. Each of the polarizing plates prepared as above was adhered so that cellulose ester film (b1) was arranged on the glass surface side of the liquid crystal cell and the absorption axis was directed in the same direction as the previously adhered polarizing plate, whereby each of the liquid crystal displays was prepared.

(View Angle Variation: Evaluation of Heat and Moisture Resistance as Polarizing Plate Protective Film)

The following evaluation was carried out employing Liquid Crystal Display 1-52, prepared as above.

The view angle of liquid crystal display was determined by employing EZ-CONTRAST 160D, produced by ELDIM Co. in an ambience of 23° C. and 55% RH. Subsequently, the above polarizing plates were allowed to stand at 60° C. and 90% RH over 1,000 hours and evaluated in the same manner as above. The resulting values were subjected to 3 levels of evaluation based on the following criteria.

A: no view angle variation was noted
B: slight view angle variation was noted
C: significant view angle variation was noted (Color Shifting: Evaluation of Heat and Moisture Resistance as Polarizing Plate Protective Film)

With regard to each of Liquid Crystal Displays 1-52 prepared as above, the display was subjected to black display and observation was carried out at a view angle of 45°. Subsequently, the same observation was carried out in the same manner as above for the above plates which had been allowed to stand at 60° C. and 90% relative humidity over 1,000 hours. The resulting color shift was evaluated based on the following criteria.

A: no color shift was noted
B: slight color shift was noted
C: significant color shift was noted Tables 3 and 4 show the evaluation results.

TABLE 4

| Polarizing plate and liquid crystal display No. | Polarizing plate protective film | | Deterioration of polarizer | Dimensional variation of polarizing plate | Viewing angle variation | Color shifting | Remarks |
|---|---|---|---|---|---|---|---|
| | Viewer's side | Liquid crystal cell side (b1) | | | | | |
| 1 | a1 | 1 | A | A | A | A | Inv. |
| 2 | a1 | 2 | C | B | C | C | Comp. |

TABLE 4-continued

| Polarizing plate and liquid crystal display No. | Polarizing plate protective film Viewer's side | Polarizing plate protective film Liquid crystal cell side (b1) | Deterioration of polarizer | Dimensional variation of polarizing plate | Viewing angle variation | Color shifting | Remarks |
|---|---|---|---|---|---|---|---|
| 3 | a1 | 3 | A | A | A | A | Inv. |
| 4 | a1 | 4 | A | A | A | A | Inv. |
| 5 | a1 | 5 | C | B | C | C | Comp. |
| 6 | a1 | 6 | A | A | A | A | Inv. |
| 7 | a1 | a1 | A | A | A | A | Inv. |
| 8 | a2 | 1 | B | B | B | B | Inv. |
| 9 | a3 | 1 | B | A | A | B | Inv. |
| 10 | a4 | 1 | B | A | A | B | Inv. |
| 11 | a5 | 1 | C | B | C | C | Comp. |
| 12 | a6 | 1 | C | B | C | C | Comp. |
| 13 | a7 | 1 | A | A | A | A | Inv. |
| 14 | a8 | 1 | A | A | A | A | Inv. |
| 15 | a9 | 1 | A | A | A | A | Inv. |
| 16 | a10 | 1 | A | A | A | A | Inv. |
| 17 | a11 | 1 | A | A | A | A | Inv. |
| 18 | a12 | 1 | A | A | A | A | Inv. |
| 19 | a13 | 1 | A | A | A | A | Inv. |
| 20 | a14 | 1 | A | A | A | A | Inv. |
| 21 | a15 | 1 | A | A | A | A | Inv. |
| 22 | a16 | 1 | A | A | A | A | Inv. |
| 23 | a17 | 1 | A | A | A | A | Inv. |
| 24 | a18 | 1 | A | A | A | A | Inv. |
| 25 | a19 | 1 | A | A | B | A | Inv. |
| 26 | a20 | 1 | A | B | A | B | Inv. |
| 27 | a21 | 1 | A | B | A | B | Inv. |
| 28 | a22 | 1 | A | A | B | A | Inv. |
| 29 | a23 | 1 | A | B | A | B | Inv. |
| 30 | a24 | 1 | A | B | A | B | Inv. |
| 31 | a25 | 1 | A | B | A | B | Inv. |
| 32 | a26 | 1 | A | B | A | B | Inv. |
| 33 | a27 | 1 | A | B | A | B | Inv. |
| 34 | a28 | 1 | A | B | A | B | Inv. |
| 35 | a29 | 1 | A | B | A | B | Inv. |
| 36 | a30 | 1 | A | B | A | B | Inv. |
| 37 | a31 | 1 | A | A | A | A | Inv. |
| 38 | a32 | 1 | A | A | B | A | Inv. |
| 39 | a33 | 1 | A | A | A | A | Inv. |
| 40 | a34 | 1 | A | A | B | A | Inv. |

TABLE 5

| Polarizing plate and liquid crystal display No. | Polarizing plate protective film Viewer's side | Polarizing plate protective film Liquid crystal cell side (b1) | Deterioration of polarizer | Dimensional variation of polarizing plate | Viewing angle variation | Color shifting | Remarks |
|---|---|---|---|---|---|---|---|
| 41 | a35 | 1 | A | A | A | A | Inv. |
| 42 | a36 | 1 | A | A | A | A | Inv. |
| 43 | a37 | 1 | A | A | A | A | Inv. |
| 44 | a38 | 1 | A | A | A | A | Inv. |
| 45 | a39 | 1 | A | A | A | A | Inv. |
| 46 | a40 | 1 | A | B | A | B | Inv. |
| 47 | a41 | 1 | A | A | A | A | Inv. |
| 48 | a42 | 1 | B | B | A | B | Inv. |
| 49 | a43 | 1 | C | A | C | C | Comp. |
| 50 | a43 | 7 | C | B | C | C | Comp. |
| 51 | a44 | 7 | C | C | C | C | Comp. |
| 52 | a45 | 7 | C | B | C | C | Comp. |

As described in Tables 4 and 5, acrylic films of the present invention exhibited excellent characteristics with regard to moderate moisture permeability, transparency, heat resistance, and improvement in brittleness. Further, polarizing plates and liquid crystal displays prepared by employing the acrylic film of the present invention exhibited excellent characteristics with regard to visibility and color shift even after the durability tests.

Example 2

<Preparation of Cellulose Ester Films (b2)>

Cellulose ester films (b2) shown in Table 6 were used.

As (b2)-1, a cellulose ester film was prepared in accordance with film 17 disclosed in Example 6 of JP-A No. 2005-272800 (containing triphenyl phosphate as a phosphate plasticizer). (b2)-2 was prepared by adding 1.5 weight parts, in 100 weight parts of cellulose ester, of an acid scavenger 1 according to the present invention (EPON 815C produced by Japan Epoxy Resin, Co., Ltd.) to (b2)-1.

As (b2)-3, a film was prepared in accordance with film CF-1 in Table 2 of JP-A No. 2008-102475 (containing triphenyl phosphate and biphenyl diphenyl phosphate as phosphate plasticizers). (b2)-4 was prepared by adding 2 weight parts, in 100 weight parts of cellulose ester, of an acid scavenger 2 according to the present invention (ADEKASIZER O-130P, produced by ADEKA Corp.) to (b2)-3.

TABLE 6

| Cellulose ester film (b2) | Film | Remarks |
|---|---|---|
| 1 | Film 17 disclosed in Example 6 of JP-A No. 2005-272800 | Comparative |
| 2 | (b2)-1 + acid scavenger 1 | Inventive |
| 3 | Film CF-1 disclosed in Table 2 of JP-A No. 2008-102475 | Comparative |
| 4 | (b2)-3 + acid scavenger 2 | Inventive |

These cellulose ester films (b2) were evaluated in the same manner as those in Example 1, and, further, polarizing plates and liquid crystal displays were prepared to be evaluated. The results were shown in Table 7.

TABLE 7

| Polarizing plate and liquid crystal display No. | Polarizing plate protective film Viewer's side | Polarizing plate protective film Liquid crystal cell side (b2) | Acid scavenger Kind | Acid scavenger Weight parts | *1 | Dimensional variation of polarizing plate | Viewing angle variation | Color shifting | Remarks |
|---|---|---|---|---|---|---|---|---|---|
| 53 | a1 | 1 | — | — | C | B | C | C | Comp. |
| 54 | a1 | 2 | 1 | 1.5 | A | A | A | A | Inv. |
| 55 | a1 | 3 | — | — | C | B | C | C | Comp. |
| 56 | a1 | 4 | 2 | 2.0 | A | A | A | A | Inv. |
| 57 | a2 | 2 | 1 | 1.5 | B | B | B | B | Inv. |
| 58 | a3 | 2 | 1 | 1.5 | B | A | A | B | Inv. |
| 59 | a4 | 2 | 1 | 1.5 | B | A | A | B | Inv. |
| 60 | a5 | 2 | 1 | 1.5 | C | B | C | C | Comp. |
| 61 | a6 | 2 | 1 | 1.5 | C | B | C | C | Comp. |
| 62 | a7 | 2 | 1 | 1.5 | A | A | A | A | Inv. |
| 63 | a8 | 2 | 1 | 1.5 | A | A | A | A | Inv. |
| 64 | a9 | 2 | 1 | 1.5 | A | A | A | A | Inv. |
| 65 | a10 | 2 | 1 | 1.5 | A | A | A | A | Inv. |
| 66 | a11 | 2 | 1 | 1.5 | A | A | A | A | Inv. |
| 67 | a12 | 2 | 1 | 1.5 | A | A | A | A | Inv. |
| 68 | a13 | 2 | 1 | 1.5 | A | A | A | A | Inv. |
| 69 | a14 | 2 | 1 | 1.5 | A | A | A | A | Inv. |
| 70 | a15 | 2 | 1 | 1.5 | A | A | A | A | Inv. |
| 71 | a16 | 2 | 1 | 1.5 | A | A | A | A | Inv. |
| 72 | a17 | 2 | 1 | 1.5 | A | A | A | A | Inv. |
| 73 | a18 | 2 | 1 | 1.5 | A | A | A | A | Inv. |
| 74 | a19 | 2 | 1 | 1.5 | A | A | B | A | Inv. |
| 75 | a20 | 2 | 1 | 1.5 | A | B | A | B | Inv. |
| 76 | a21 | 2 | 1 | 1.5 | A | B | A | B | Inv. |
| 77 | a22 | 2 | 1 | 1.5 | A | A | B | A | Inv. |
| 78 | a23 | 2 | 1 | 1.5 | A | B | A | B | Inv. |
| 79 | a24 | 2 | 1 | 1.5 | A | B | A | B | Inv. |
| 80 | a25 | 2 | 1 | 1.5 | A | B | A | B | Inv. |
| 81 | a26 | 2 | 1 | 1.5 | A | B | A | B | Inv. |
| 82 | a27 | 2 | 1 | 1.5 | A | B | A | B | Inv. |
| 83 | a28 | 2 | 1 | 1.5 | A | B | A | B | Inv. |
| 84 | a29 | 2 | 1 | 1.5 | A | B | A | B | Inv. |
| 85 | a30 | 2 | 1 | 1.5 | A | B | A | B | Inv. |
| 86 | a31 | 2 | 1 | 1.5 | A | A | A | A | Inv. |
| 87 | a32 | 2 | 1 | 1.5 | A | A | B | A | Inv. |
| 88 | a33 | 2 | 1 | 1.5 | A | A | A | A | Inv. |
| 89 | a34 | 2 | 1 | 1.5 | A | A | B | A | Inv. |
| 90 | a35 | 2 | 1 | 1.5 | A | A | A | A | Inv. |
| 91 | a36 | 2 | 1 | 1.5 | A | A | A | A | Inv. |
| 92 | a37 | 2 | 1 | 1.5 | A | A | A | A | Inv. |
| 93 | a38 | 2 | 1 | 1.5 | A | A | A | A | Inv. |
| 94 | a39 | 2 | 1 | 1.5 | A | A | A | A | Inv. |

TABLE 8

| Polarizing plate and liquid crystal display No. | Viewer's side | Polarizing plate protective film Liquid crystal cell side (b2) | Acid scavenger Kind | Weight parts | *1 | Dimensional variation of polarizing plate | Viewing angle variation | Color shifting | Remarks |
|---|---|---|---|---|---|---|---|---|---|
| 95 | a40 | 2 | 1 | 1.5 | A | B | A | B | Inv. |
| 96 | a41 | 2 | 1 | 1.5 | A | A | A | A | Inv. |
| 97 | a42 | 2 | 1 | 1.5 | B | B | A | B | Inv. |
| 98 | a43 | 3 | 1 | 1.5 | C | A | C | C | Comp. |
| 99 | a44 | 3 | 1 | 1.5 | C | C | C | C | Comp. |
| 100 | a45 | 3 | 1 | 1.5 | C | B | C | C | Comp. |
| 101 | a43 | 4 | 1 | 1.5 | C | A | C | B | Comp. |
| 102 | a44 | 4 | 1 | 1.5 | C | C | C | B | Comp. |
| 103 | a45 | 4 | 1 | 1.5 | B | B | C | B | Comp. |

As described in Tables 7 and 8, acrylic films of the present invention exhibited excellent characteristics with regard to moderate moisture permeability, transparency, heat resistance, and improvement in brittleness. Further, polarizing plates and liquid crystal displays prepared by employing the acrylic film of the present invention exhibited excellent characteristics with regard to visibility and color shift even after the durability tests.

EXPLANATION OF THE NUMERALS

1 dissolving kettle
3, 6, 12, and 15 filters
4 and 13 stock kettles
5 and 14 liquid transporting pumps
8 and 16 circuit pipes
10 UV absorber mixing kettle
20 junction pipe
21 mixer
30 die
31 metal support
32 web
33 peeling position
34 tenter apparatus
35 roll dryer
41 particle preparing kettle
42 stock kettle
43 pump
44 filter

What is claimed is:

1. A polarizing plate comprising:
an acrylic film (a) having a moisture permeability of 100-500 g/m²·24 hr;
a cellulose ester film (b1) containing no phosphate plasticizer or a cellulose ester film (b2) containing a phosphate plasticizer and an acid scavenger; and
a polarizer comprising a polyvinyl alcohol, the polarizer being sandwiched between the acrylic film (a) and one of the cellulose ester film (b1) and the cellulose ester film (b2), wherein the polarizing plate is provided on at least one surface of a liquid crystal cell so that cellulose ester film (b1) or (b2) faces the liquid crystal cell,
wherein the acrylic film (a) comprises an acrylic resin (A) and a cellulose ester resin (B) at a weight ratio of 95:5 to 60:40 in a compatible state,
wherein the acrylic resin (A) has a weight average molecular weight Mw of 80000 to 1000000, and the cellulose ester resin (B) has a weight average molecular weight Mw of 75000-300000 and a total substitution degree (T) of an acyl group of 2.0-3.0,
wherein the acrylic film (a) is free from ductile fracture under a condition of 23° C. and 55% RH, and
wherein the acrylic film (a) exhibits a tension softening point of 105-145° C. and a haze of less than 1%.

2. The polarizing plate of claim 1, wherein
the cellulose ester resin (B) has
a weight average molecular weight Mw of 75000-280000,
a total substitution degree (T) of an acyl group of 2.0-3.0, and
a substitution degree of an acyl group having 3-7 carbon atoms of 1.2-3.0, and
the acrylic film (a) has a moisture permeability of 200-450 g/m²·24 hr.

3. A liquid crystal display employing the polarizing plate of claim 2.

4. A liquid crystal display employing the polarizing plate of claim 1.

* * * * *